US012586280B2

(12) United States Patent
Pan et al.

(10) Patent No.: US 12,586,280 B2
(45) Date of Patent: Mar. 24, 2026

(54) TECHNIQUES FOR GENERATING DUBBED MEDIA CONTENT ITEMS

(71) Applicant: NETFLIX, INC., Los Gatos, CA (US)

(72) Inventors: Chao Pan, Sunnyvale, CA (US); Yiwei Zhao, San Jose, CA (US)

(73) Assignee: NETFLIX, INC., Los Gato, CA (US)

( * ) Notice: Subject to any disclaimer, the term of this patent is extended or adjusted under 35 U.S.C. 154(b) by 58 days.

(21) Appl. No.: 18/396,578

(22) Filed: Dec. 26, 2023

(65) Prior Publication Data

US 2025/0209707 A1     Jun. 26, 2025

(51) Int. Cl.
    *G06T 13/20*        (2011.01)
    *G06T 13/40*        (2011.01)
    (Continued)

(52) U.S. Cl.
    CPC ............ *G06T 13/205* (2013.01); *G06T 13/40* (2013.01); *G06T 15/04* (2013.01); *G06T 15/506* (2013.01);
    (Continued)

(58) Field of Classification Search
    CPC ....... G06T 13/205; G06T 13/40; G06T 15/04; G06T 15/506; G06T 19/20; G06T 2219/2004; G06T 2207/20081; G06T 2207/20084; G06T 2207/30201; G06T 7/33; G06T 15/20; G06V 40/165; G06V 40/167; G06V 40/168; G06V 40/171; G06V 40/176; G06V 10/82
    See application file for complete search history.

(56) References Cited

U.S. PATENT DOCUMENTS 11,176,724 B1    11/2021  Sinha et al.
11,222,466 B1    1/2022   Naruniec et al.
(Continued)

FOREIGN PATENT DOCUMENTS

CN         116740261 A  *  9/2023   ............. G06T 17/00

OTHER PUBLICATIONS

Wood, E. et al. (2022). "3D Face Reconstruction with Dense Landmarks". In: Avidan, S., Brostow, G., Cissé, M., Farinella, G.M., Hassner, T. (eds) Computer Vision—ECCV 2022. ECCV 2022. (Year: 2022).*

(Continued)

*Primary Examiner* — Kee M Tung
*Assistant Examiner* — Xiaoming Wei
(74) *Attorney, Agent, or Firm* — Artegis Law Group, LLP

(57)                ABSTRACT

In various embodiments, a dubbing application performs three-dimensional (3D) tracking of (1) the face of an actor within video frames of a first media content item to generate 3D geometry representing the face of the actor, and (2) the face of a dubber within video frames of a second media content item to generate 3D geometry representing the face of the dubber. The dubbing application also tracks the texture and lighting of the face of the actor in the first media content item. The dubbing application aligns the 3D geometry of the face of the dubber with the 3D geometry of the face of the actor. Then, the dubbing application performs neural rendering to generate dubbed video frames using a trained machine learning model, the aligned 3D geometry of the dubber, the texture and lighting of the face of the actor, and the video frames of the first media content.

20 Claims, 13 Drawing Sheets

(51) Int. Cl.
G06T 15/04 (2011.01)
G06T 15/50 (2011.01)
G06T 19/20 (2011.01)
(52) U.S. Cl.
CPC ...... G06T 19/20 (2013.01); G06T 2219/2004 (2013.01)

(56) References Cited

U.S. PATENT DOCUMENTS

| | | | | |
|---|---|---|---|---|
| 11,581,020 | B1* | 2/2023 | Hadap | G11B 27/036 |
| 2022/0148335 | A1* | 5/2022 | Liu | G06V 10/774 |
| 2022/0351348 | A1 | 11/2022 | Chae et al. | |
| 2022/0358719 | A1 | 11/2022 | Cao et al. | |
| 2022/0375224 | A1 | 11/2022 | Chae | |
| 2023/0154090 | A1 | 5/2023 | Bradley et al. | |
| 2023/0343010 | A1 | 10/2023 | Kwatra et al. | |
| 2025/0014253 | A1* | 1/2025 | Bharaj | G10L 21/10 |
| 2025/0140257 | A1* | 5/2025 | Cohen-Or | G10L 15/25 |

OTHER PUBLICATIONS

Zheng, Wenzhuo et al. "Multi-view 3D Face Reconstruction Based on Flame", Aug. 15, 2023, DO—10.48550/arXiv.2308.07551 (Year: 2023).*
Zhang et al. machine translation of CN-116740261-A (Year: 2023).*
Patel et al. "Visual dubbing pipeline with localized lip-sync and two-pass identity transfer", Computers & Graphics, vol. 110, 2023, pp. 19-27 (Year: 2023).*
Feng et al. "Joint 3D Face Reconstruction and Dense Alignment with Position Map Regression Network" In: Ferrari, V., Hebert, M., Sminchisescu, C., Weiss, Y. (eds) Computer Vision—ECCV 2018. ECCV 2018. Lecture Notes in Computer Science( ), vol. 11218. Springer, Cham. (Year: 2018).*
International Search Report for Application No. PCT/US2024/061554 dated Mar. 12, 2025.
International Search Report for Application No. PCT/US2024/061558 dated Mar. 3, 2025.
International Search Report for Application No. PCT/US2024/061560 dated Mar. 3, 2025.
Patel et al., "Visual Dubbing Pipeline With Localized Lip-Sync And Two-Pass Identity Transfer", Computers & Graphics, vol. 110, DOI: 10.1016/j.cag.2022.11.005, Nov. 17, 2022, pp. 19-27.
Feng et al., "Joint 3D Face Reconstruction and Dense Alignment with Position Map Regression Network", European Computer Vision Association, Oct. 9, 2018, 18 pages.
Kim et al., "Neural Style-Preserving Visual Dubbing", ACM Transactions on Graphics, https://doi.org/10.1145/3355089.3356500, vol. 38, No. 6, Article 178, Nov. 8, 2019, pp. 178:1-178:13.
Ma et al., "Real-Time Facial Expression Transformation for Monocular RGB Video", DOI: 10.1111/CGF.13586, vol. 38, No. 1, Oct. 10, 2018, pp. 470-481.
Karras et al., "A Style-Based Generator Architecture for Generative Adversarial Networks", IEEE Transactions on Pattern Analysis And Machine Intelligence, DOI: 10.1109/TPAMI.2020.2970919vol. 43, No. 12, Dec. 2021, pp. 4217-4228.
Liang et al., "Expressive Talking Head Generation with Granular Audio-Visual Control", Computer Vision and Pattern Recognition, 2022, pp. 3387-3396.
Zhou et al., "Pose-Controllable Talking Face Generation by Implicitly Modularized Audio-Visual Representation", Computer Vision and Pattern Recognition, 2021, pp. 4176-4186.
Tao, Ruijie, "Is someone talking? TalkNet: Audio-visual Active Speaker Detection Model", retrieved from https://github.com/TaoRuijie/TalkNet-ASD on 2021, 5 pages.
Xu et al., "Simple And Effective Zero-Shot Cross-Lingual Phoneme Recognition", arXiv:2109.11680, Sep. 23, 2021, 8 pages.
Python, "Face Landmark Detection", Python, retrieved from dlib.net/face_landmark_detection.py.html on Jan. 15, 2024, 2 pages.

Github, "AV-HuBERT (Audio-Visual Hidden Unit BERT)", retrieved from https://github.com/facebookresearch/av_hubert on Jan. 15, 2024, 5 pages.
"Google Keynote (Google I/O '23)", retrieved from https://www.youtube.com/watch?v=cNfINi5CNbY&t=4490s on Jan. 15, 2024, 3 pages.
Thies et al., "Deferred Neural Rendering: Image Synthesis using Neural Textures", arXiv:1904.12356, Apr. 28, 2019, pp. 1-12.
Isola et al., "Image-to-Image Translation with Conditional Adversarial Networks", arXiv:1611.07004, Nov. 26, 2018, pp. 1-17.
Karras et al., "Training Generative Adversarial Networks with Limited Data", 34th Conference on Neural Information Processing Systems, arXiv:2006.06676, Oct. 7, 2020, pp. 1-37.
Nvidia, "vid2vid: Pytorch Implementation of Our Method for High-Resolution Photorealistic Video-To-Video Translation", retrieved from https://github.com/NVIDIA/vid2vid on Jan. 15, 2024, 7 pages.
Matthias, Niessner, "Why Neural Rendering is Super Cool!", YouTube, Vision Seminar, retrieved from https://www.youtube.com/watch?v=-KGZmzP4P1l, May 19, 2020, 2 pages.
Gajarsky, Tomas, "Facetorch: Python library for analysing faces using PyTorch", retrieved from https://github.com/tomas-gajarsky/facetorch on Jan. 15, 2024, 9 pages.
Github, "VNext Projects IDOL", retrieved from https://github.com/wjf5203/VNext/blob/main/projects/IDOL/IDOL.md on Jan. 15, 2024, 3 pages.
Amir, "FECNet: Facial Expression Feature Extractor", retrieved from https://github.com/AmirSh15/FECNet, Oct. 23, 2022, 3 pages.
Fox et al., "StyleVideoGAN: A Temporal Generative Model using a Pretrained StyleGAN", arXiv:2107.07224, Nov. 30, 2021, 18 pages.
Kreuk et al., "Self-Supervised Contrastive Learning for Unsupervised Phoneme Segmentation (INTERSPEECH, 2020)", retrieved from https://github.com/felixkreuk/UnsupSeg, 2020, 4 pages.
Xinwen, "AudioDVP: Photorealistic Audio-driven Video Portraits", retrieved from https://github.com/xinwen-cs/AudioDVP on Jan. 15, 2024, 4 pages.
"Deep3DFaceRecon_pytorch: Accurate 3D Face Reconstruction with Weakly-Supervised Learning", From Single Image to Image Set—PyTorch Implementation, retrieved from github.com/sicxu/Deep3DFaceRecon_pytorch, 2019, 6 pages.
Dong et al., "Supervision-by-Registration: An Unsupervised Approach to Improve the Precision of Facial Landmark Detectors", retrieved from https://github.com/facebookresearch/supervision-by-registration on Jan. 15, 2024, 5 pages.
Wood et al., "3D Face Reconstruction with Dense Landmarks", arXiv:2204.02776, Jul. 20, 2022, pp. 1-24.
Bolkart, Timo, "Convert from Basel Face Model (BFM) to FLAME", retrieved from https://github.com/TimoBolkart/BFM_to_FLAME on Jan. 15, 2024, 4 pages.
Nagano et al., "paGAN: Real-time Avatars Using Dynamic Textures", retrieved from https://vgl.ict.usc.edu/Research/paGAN/, 2018, 3 pages.
Zakharov et al., "Realistic-Neural-Talking-Head-Models", retrieved from https://github.com/vincent-thevenin/Realistic-Neural-Talking-Head-Models on Jan. 15, 2024, 5 pages.
Zakharov et al., "Grey-eye Talking-heads", retrieved from https://github.com/grey-eye/talking-heads on Jan. 15, 2024, 5 pages.
Github, "TencentARC/GFPGAN: GFPGAN aims at developing Practical Algorithms for Real-world Face Restoration", retrieved from https://github.com/TencentARC/GFPGAN on Jan. 15, 2024, 5 pages.
Github, "VMAF—Video Multi-Method Assessment Fusion", Netflix, retrieved from https://github.com/Netflix/vmaf on Jan. 15, 2024, 4 pages.
Grassal et al., "Neural Head Avatars from Monocular RGB Videos", retrieved from https://github.com/philgras/neural-head-avatars, 2022, 6 pages.
Zhengyuf, "I M Avatar: Implicit Morphable Head Avatars from Videos", retrieved from https://github.com/zhengyuf/IMavatar, 2022, 4 pages.
Chen et al., "Implicit Neural Head Synthesis via Controllable Local Deformation Fields", retrieved from https://imaging.cs.cmu.edu/local_deformation_fields/ on Jan. 15, 2024, 3 pages.

(56) References Cited

OTHER PUBLICATIONS

Yang et al., "GAN Prior Embedded Network for Blind Face Restoration in the Wild", retrieved from https://github.com/yangxy/GPEN on Jan. 15, 2024, 5 pages.

Non Final Office Action received for U.S. Appl. No. 18/396,590, dated Jul. 23, 2025, 36 pages.

Non Final Office Action received for U.S. Appl. No. 18/396,583, dated Dec. 12, 2025, 37 pages.

Final Office Action received for U.S. Appl. No. 18/396,590, dated Feb. 11, 2026, 30 pages.

* cited by examiner

502

504

502

514

From 902 and 904

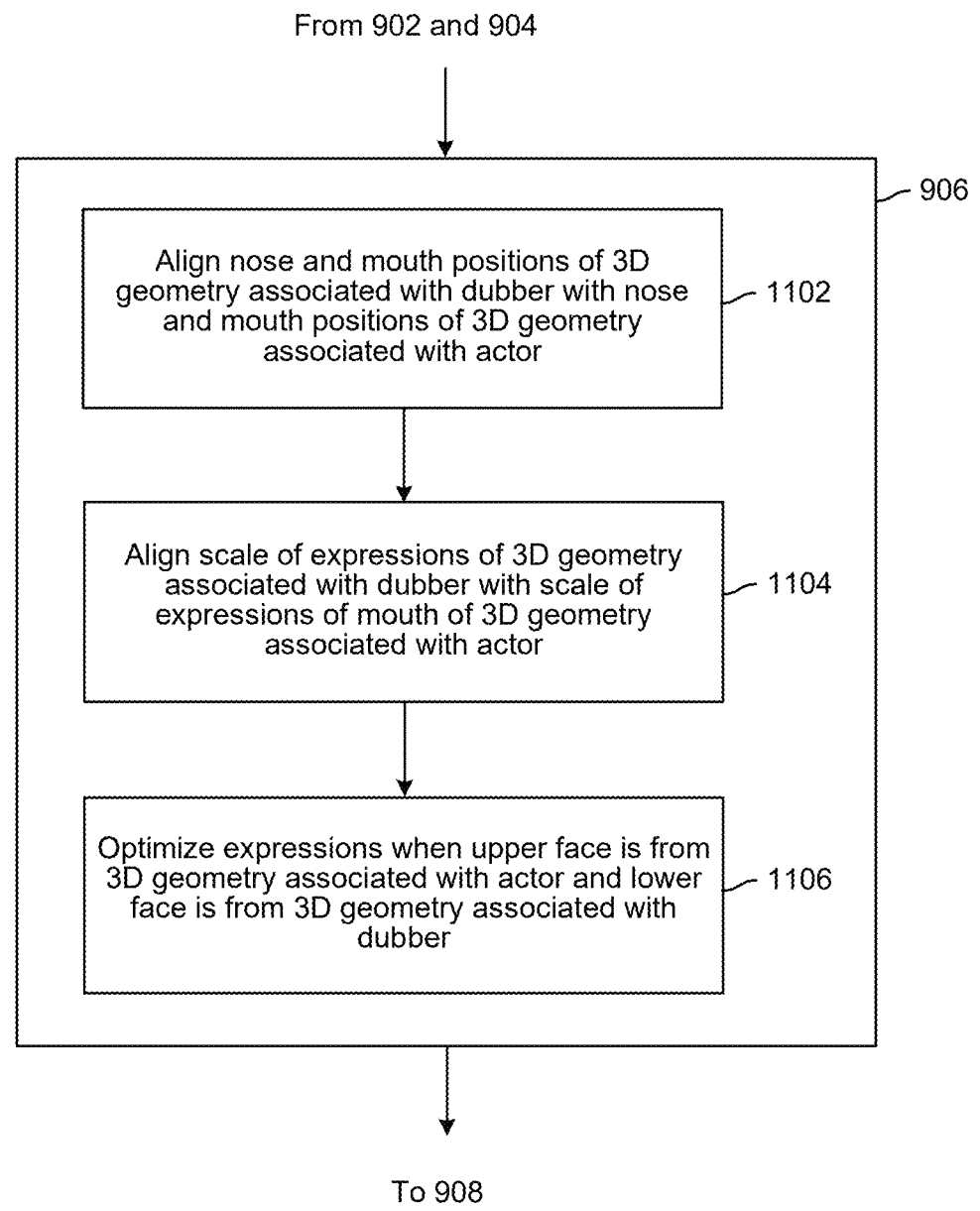

Align nose and mouth positions of 3D
geometry associated with dubber with nose
and mouth positions of 3D geometry
associated with actor — 1102

Align scale of expressions of 3D geometry
associated with dubber with scale of
expressions of mouth of 3D geometry
associated with actor — 1104

Optimize expressions when upper face is from
3D geometry associated with actor and lower
face is from 3D geometry associated with
dubber — 1106

TECHNIQUES FOR GENERATING DUBBED MEDIA CONTENT ITEMS

BACKGROUND

Field of the Invention

Embodiments of the present disclosure relate generally to video processing, computer science, and machine learning and, more specifically, to techniques for generating dubbed media content items.

Description of the Related Art

Dubbing is a process in which the audio of a media content item that also includes video, such as a film or television show, is replaced with audio in a different language. One conventional approach for dubbing is to carefully select words in the different language that, when spoken, roughly match the facial movements of an actor in a given media content item. However, because the actor in the media content item is not speaking the same language as the audio in the different language, there are invariably noticeable disparities between the facial movements of the actor in the media content item and the audio in the different language.

Another conventional approach for dubbing is to capture the face of an actor in a media content item using a facial capture system. A graphics rendering engine can then render images of the captured face making different expressions that correspond to audio in a different language. One drawback of this approach, however, is that conventional graphics engines oftentimes require considerable amounts of time to render images. A further drawback of this approach is that, as a general matter, conventional graphics engines are unable to render images of faces that look photorealistic. Accordingly, the face of an actor depicted in a media content item that includes such renderings can end up resembling the face of a character in a video game. Yet another drawback of this approach is that the face of an actor needs to be captured using a complex facial capture system, which may not be available to the producer of a given media content item.

As the foregoing illustrates, what is needed in the art are more effective techniques for generating dubbed media content items.

SUMMARY OF THE EMBODIMENTS

One embodiment of the present disclosure sets forth a computer-implemented method for generating a dubbed media content item. The method includes generating first three-dimensional (3D) geometry, a texture map, and a lighting map based on a face of an actor included in a first video frame of a first media content item. The method further includes generating second 3D geometry based on a face of a dubber included in a second video frame of a second media content item. The method also includes performing one or more operations that align the second 3D geometry with the first 3D geometry to generate an aligned second 3D geometry. In addition, the method includes performing one or more operations via one or more trained machine learning models to render a third video frame based on the aligned second 3D geometry, the texture map, the lighting map, and the first video frame of the first media content item.

Other embodiments of the present disclosure include, without limitation, one or more computer-readable media including instructions for performing one or more aspects of the disclosed techniques as well as a computing device for performing one or more aspects of the disclosed techniques.

At least one technical advantage of the disclosed techniques relative to the prior art is that the disclosed techniques can be used to generate dubbed media content items that include photorealistic videos that closely match dubbed audio in a different language. The disclosed techniques are also, as a general matter, faster than conventional graphics rendering techniques for rendering faces. In addition, the disclosed techniques do not require a facial capture system to generate dubbed media content items. Accordingly, the disclosed techniques can be implemented in post production to generate photorealistic dubbed media content that is more enjoyable to viewers than traditional dubbed media content. These technical advantages represent one or more technological improvements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 11 is a flow diagram of method steps for retargeting 3D geometry associated with a dubber to align with 3D geometry associated with an actor, according to various embodiments;

DETAILED DESCRIPTION

Figure 1:
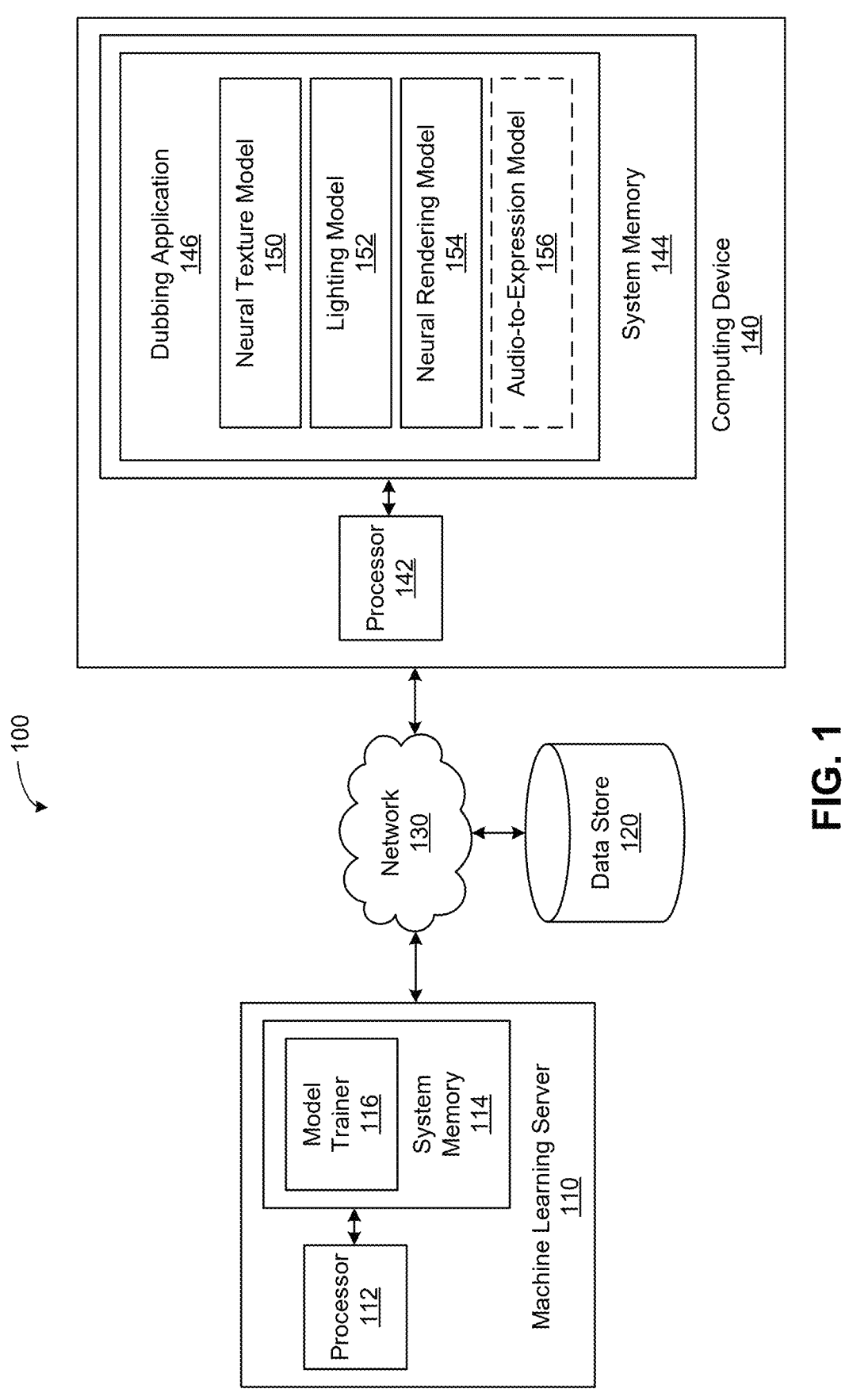
FIG. 1 illustrates a system configured to implement one or more aspects of the various embodiments.

As described, conventional approaches for generating dubbed media content items involve either (1) carefully selecting the words in a different language to roughly match the facial movements of an actor in a media content item, or (2) rendering the captured face of an actor in a media content item to match audio in a different language. When words in the different language are selected to roughly match the facial movements of an actor, there are invariably noticeable disparities between the facial movements of the actor and the audio in the different language. When the captured face of an actor is rendered, the rendering can require a significant amount of time and generate a rendered face that is not particularly photorealistic. In addition, a facial capture system for capturing the face of the actor may not be available to the producer of a given media content item.

The disclosed techniques generate dubbed media content items by modifying the pixels of original media content items to match audio in a different language than the original media content items. In some embodiments, a dubbing application performs three-dimensional (3D) tracking of (1) the face of an actor within video frames of a first media content item in order to generate 3D geometry representing the face of the actor in each video frame of the first media content item, and (2) the face of a dubber within video frames of a second media content item in order to generate 3D geometry representing the face of the dubber in each video frame of the second media content item. The dubbing application also tracks the texture and lighting of the face of the actor in each video frame of the first media content item. Subsequent to the 3D tracking, the dubbing application aligns the 3D geometry of the face of the dubber with the 3D geometry of the face of the actor to generate aligned 3D geometry of the dubber. Then, the dubbing application performs neural rendering via a trained machine learning model to generate dubbed video frames using the aligned 3D geometry of the dubber, the texture and lighting of the face of the actor, the video frames of the first media content item, and masks indicating which region(s) of the video frames are to be inpainted. In some embodiments, when only audio of the dubber is available, the dubbing application can convert the audio into 3D geometry that is used, instead of 3D geometry that is determined via the 3D tracking technique described above, to generate a dubbed media content item.

Advantageously, the disclosed techniques address various limitations of conventional approaches for dubbing media content items. More specifically, the disclosed techniques can be used to generate dubbed media content items that include photorealistic videos that closely match dubbed audio in a different language. In addition, the disclosed techniques are, as a general matter, faster than conventional graphics rendering techniques for rendering faces, and the disclosed techniques do not require a facial capture system to generate dubbed media content items.

System Overview

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard, a mouse, a joystick, a touchpad, or a touchscreen. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The memory 114 of the machine learning server 110 stores content, such as software applications and data, for use by the processor 112 and the GPU. The memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the memory 114 may be modified as desired. Further, the connection topology between the various units in FIG. 1 may be modified as desired. In some embodiments, any combination of the processor 112, the memory 114, and a GPU may be replaced with any type of virtual computing system, distributed computing system, or cloud computing environment, such as a public, private, or a hybrid cloud.

As discussed in greater detail below, the model trainer 116 is configured to train machine learning models, including a neural texture model 150, a lighting model 152, a neural rendering model 154, and an optional audio-to-expression model 156. Training data and/or trained machine learning models, including the neural texture model 150, lighting model 152, neural rendering model 154, and/or audio-to-expression model 156, can be stored in the data store 120 or elsewhere. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

Subsequent to training, the neural texture model 150, lighting model 152, neural rendering model 154, and/or audio-to-expression model 156 can be deployed to any suitable applications, including applications that generate dubbed media content items. Illustratively, a dubbing application 146 that utilizes the neural texture model 150, lighting model 152, neural rendering model 154, and audio-to-expression model 156 is stored in a memory 144, and executes on a processor 142, of the computing device 140. The dubbing application 146 is discussed in greater detail below in conjunction with FIGS. 2-13. In some embodiments, components of the computing device 140, including the memory 144 and the processor 142, can be similar to corresponding components of the machine learning server 110.

The number of machine learning servers and application servers may be modified as desired in some embodiments. Further, the functionality included in any of the applications may be divided across any number of applications or other software that are stored and executed via any number of devices that are located in any number of physical locations.

Generating Dubbed Media Content Items

Figure 2:
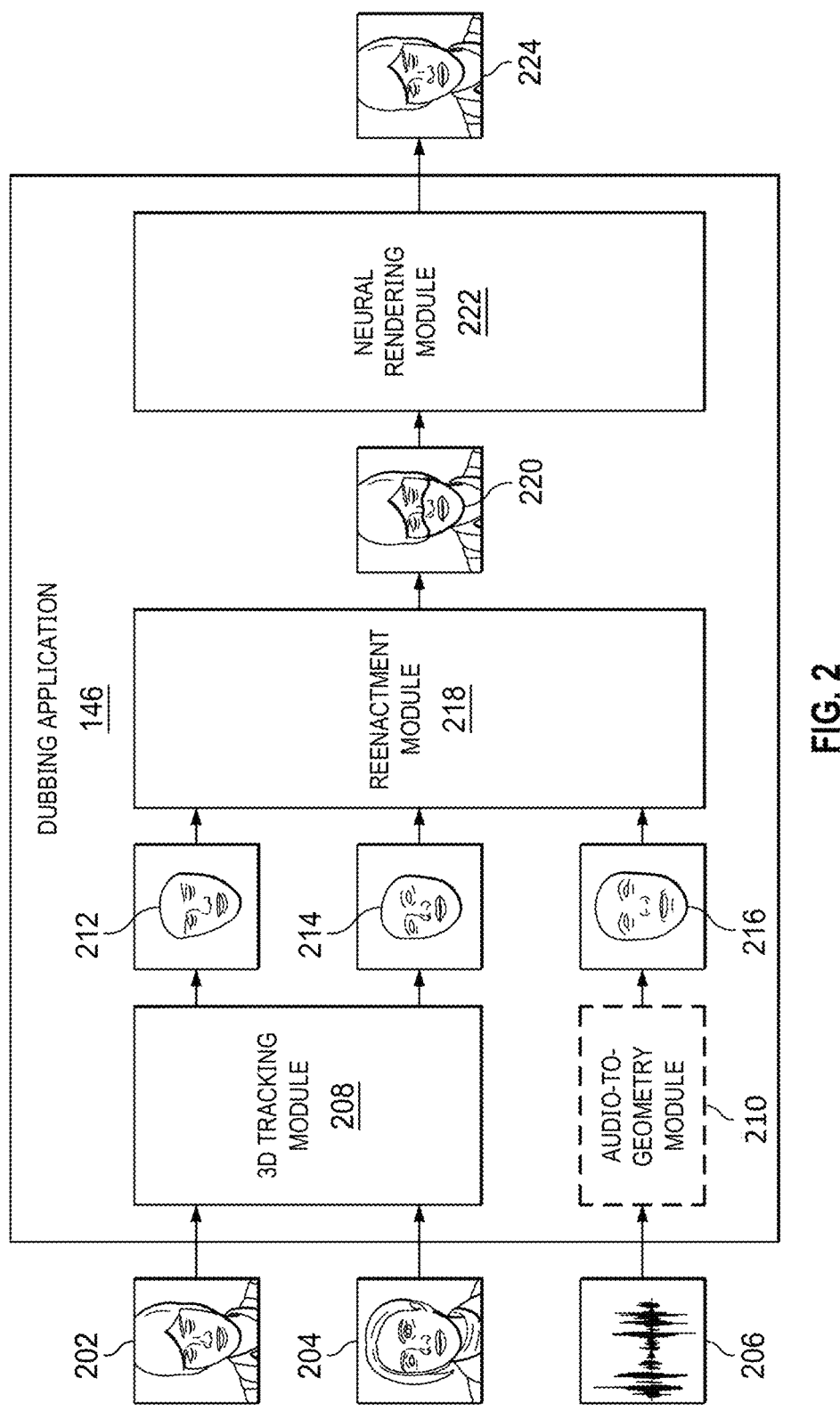
FIG. 2 illustrates in greater detail the dubbing application of FIG. 1, according to various embodiments.

FIG. 2 illustrates in greater detail the dubbing application 146 of FIG. 1, according to various embodiments. As shown, the dubbing application 146 includes a three-dimensional (3D) tracking module 208, an optional audio-to-geometry module 210, a reenactment module 218, and a neural rendering module 222. In operation, the dubbing application 146 takes as input the frames of a first video of an actor speaking a first language, shown as video frame 202, and either (1) the frames of a second video of a dubber speaking a second language, shown as video frame 204, or (2) audio 206 of the dubber speaking the second language, shown as audio 206. Given such inputs, the dubbing application 146 generates frames of a dubbed video, shown as dubbed video frame 224, in which the actor speaks the second language. The dubbed video can include lip movements of the dubber transposed onto the actor. Although one video frame 202 and 204 and one dubbed video frame 224 are shown for illustrative purposes, in some embodiments the dubbing application 146 can process any number of frames of a video of an actor and corresponding frame(s) of a video of a dubber. For example, in some embodiments, the dubbing application 146 can process the video frames of one scene at a time, with each scene being a given length of time. As another example, in some embodiments, the dubbing application 146 can process the video frames of one shot at a time. Although the dubbing application 146 is shown as being able to generate the dubbed video using either frames of the second video of the dubber or audio of the dubber, in some embodiments, a dubbing application may only be able to use frames of a second video of a dubber or audio of a dubber, but not both, to generate a dubbed video.

The 3D tracking module 208 is configured to track the position, orientation, size, and expressions of a face in one or more frames of a video and generate, for each frame, a 3D geometry of the face, a texture (also referred to herein as a "texture map") indicating colors of different points on the face that pixels of the texture correspond to, and lighting (also referred to herein as a "lighting map") associated with the face in the frame. Illustratively, for the frame 202 of the first video of the actor speaking the first language, the 3D tracking module 208 performs the 3D tracking technique to generate a 3D geometry 212, texture (not shown), and lighting (not shown) associated with the actor in the frame 202. Similarly, for the frame 204 of the second video of the dubber speaking the second language, the 3D tracking module 208 performs the 3D tracking technique to generate a 3D geometry 214, texture (not shown), and lighting (not shown) associated with the dubber in the frame 204. As discussed in greater detail below in conjunction with FIG. 3, in some embodiments, the 3D tracking module 208 can perform 3D tracking by fitting a rough 3D geometry based on detected facial landmarks in a video frame, optimizing parameters of the 3D geometry based on a loss function to fine tune the facial expressions and orientation of the 3D geometry, optimizing vertices of the 3D geometry based on another loss function to further fine tune the facial expressions of the 3D geometry, and optimizing a texture and lighting based on differences between frames that are rendered using texture and lighting estimated during the optimization and frames of the first video.

The reenactment module 218 is configured to align the 3D geometry 214 associated with the dubber with the 3D geometry 212 associated with the actor to generate retargeted 3D geometry 220. For example, if the actor only opens his or her mouth slightly when speaking but the dubber opens his or her mouths more widely when speaking, then the 3D geometry associated with the dubber can be aligned to normalize the scale at which the mouth is opened to match the scale at which the actor opens his or her mouth. A dubbed media content item that is generated using the retargeted 3D geometry 220 will include the actor speaking in a manner that resembles the original performance of the actor. In particular, the dubbed media content item can include a similar motion range, relatively little distortion on the nose, and relatively little gap on the face boundary. As discussed in greater detail below in conjunction with FIG. 6, in some embodiments, to generate the retargeted 3D geometry 220, the reenactment module 218 first aligns the nose and mouth positions of the 3D geometry 214 associated with the dubber with the nose and mouth positions of the 3D geometry associated 212 with the actor. Then the reenactment module 218 equalizes the scale of expressions of the 3D geometry 214 associated with the dubber with the scale of expressions of the 3D geometry 212 associated with the actor. Thereafter, the reenactment module 218 optimizes the expressions when the upper face is from the 3D geometry 212 associated with the actor and the lower face is from the 3D geometry 214 associated with the dubber.

The neural rendering module 222 is configured to generate a dubbed media content item video frame, shown as video frame 224, that includes a photorealistic depiction of the actor speaking the second language previously spoken by the dubber. As discussed in greater detail below in conjunction with FIG. 7, in some embodiments, the neural rendering module 222 crops and centralizes the face in each frame of the first video of the actor based on results of the 3D tracking performed by the 3D tracking module 208 to generate a corresponding aligned frame. Then, the neural rendering module 222 converts the texture and lighting associated with each frame of the first video into a corresponding neural texture and a corresponding neural lighting, respectively. For each frame of the first video, the neural rendering module 222 inputs the corresponding aligned frame, a combination of the corresponding neural texture and neural lighting, and an inpainting mask into the neural rendering model 154, which generates a corresponding video frame of a dubbed media content item frame, shown as video frame 224.

Alternatively, if the audio 206 of the dubber speaking the second language is received as input rather than frame 204 of the second video of the dubber, then the optional audio-to-geometry module 210 can convert the audio 206 of the dubber speaking the second language into 3D geometry 216 associated with the dubber in the audio 206. The 3D geometry 216 is then input into the reenactment module 218 in lieu of the 3D geometry 214. In turn, the reenactment module 218 aligns the 3D geometry 216 with the 3D geometry 212 associated with the actor, and the neural rendering module 222 renders a video frame based on the aligned 3D geometry, the video frame 202, texture and lighting determined from the video frame, and an inpainting mask, similar to the discussion above.

Figure 3:
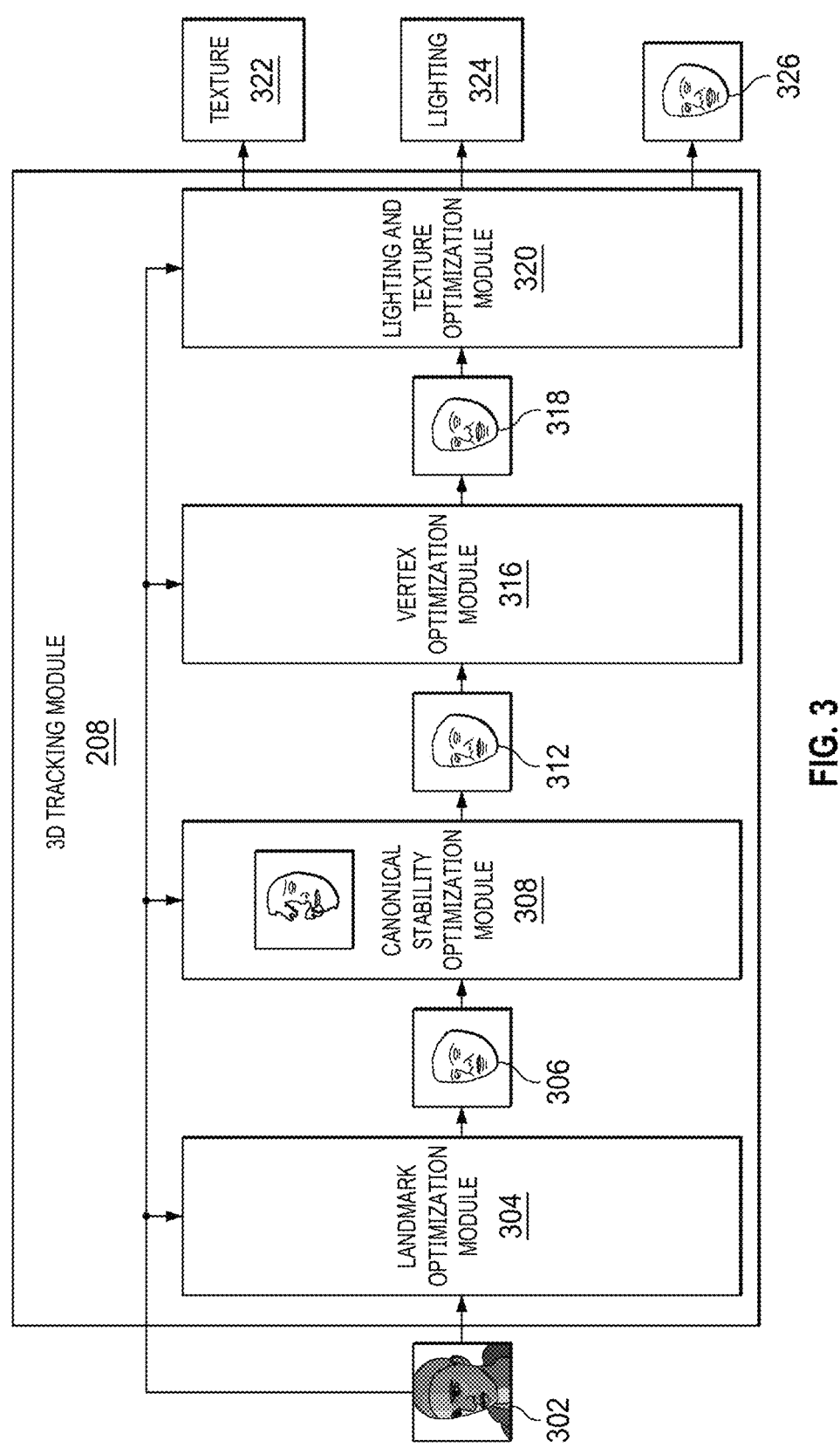
FIG. 3 illustrates in greater detail the three-dimensional (3D) tracking module of FIG. 2, according to various embodiments.

FIG. 3 illustrates in greater detail the 3D tracking module 208 of FIG. 2, according to various embodiments. As shown, the 3D tracking module 208 includes a landmark optimization module 304, a canonical stability optimization module 308, a vertex optimization module 316, and a lighting and texture optimization module 320. In operation, the 3D tracking module 208 takes as input the frames of a video, shown as video frame 302, and the 3D tracking module 208 outputs, for each frame, a 3D geometry, texture, and lighting associated with a face in the frame, which are shown for the video frame 302 as 3D geometry 326, texture 322, and lighting 324, respectively. In some embodiments, 3D tracking can be performed on a shot-by-shot basis, assuming that the face of an actor does not change drastically from one frame to another during the same shot. In some other embodiments, 3D tracking can be performed across shots for each individual in the shots. In such cases, the 3D tracking module 208 can identify boundaries of the shots and identities of faces in the shots, group the shots based on the facial identities, and perform 3D tracking for each facial identity using the shots associated with that facial identity.

The landmark optimization module 304 is configured to (1) detect facial landmarks in a video frame, and (2) fit a rough 3D geometry 306 of a face based on the detected facial landmarks. In some embodiments, the facial landmarks can be detected in any technically feasible manner, such as using a trained machine learning model (e.g., a transformer-based facial landmark detection network), and any suitable landmarks can be detected. For example, some landmarks can be located at the corners of the eyes, at the corners of the mouth, at the ends of the eyeballs, etc. 3D tracking of the profile of a face is an edge case that is particularly challenging, as the dynamic 3D geometry of the facial silhouette needs to match the face boundary in a video frame. In some embodiments, to enable 3D tracking of faces, including in edge cases such as the profiles of faces, a machine learning model is trained to detect facial landmarks using as training data a graphic synthesized dataset that includes rendered images of faces and corresponding landmarks associated with the faces. When generating the synthesized dataset, the landmarks are placed not on boundaries between the faces and the background but on the ends of the face areas (skin).

In some embodiments, the 3D geometry 306 can be defined by a model that includes a number of parameters that can be adjusted to modify the 3D geometry 306. For example, in some embodiments, the 3D geometry model can be a statistical object model separating shape from appearance variation, such as the 3D Morphable Model (3DMM), that permits faces with different expressions (e.g., eyes opened, eyes closed, mouth opened, mouth closed, etc.) to be generated by manipulating weight parameters that control various aspects of the face, such as the identity of the face, the position and orientation of the face, the shape of the face, and the facial expression. In such cases, subsequent to detecting landmarks in a video frame using the trained machine learning model described above, the landmark optimization module 304 can fit the 3D geometry model to the face in a video frame by changing the weight parameters of the 3D geometry model such that landmarks associated with the 3D geometry 306 align with corresponding landmarks detected in the video frame. For example, in some embodiments, the alignment can include minimizing a distance between the landmarks associated with the 3D geometry and corresponding landmarks detected in the video frame.

The canonical stability optimization module 308 optimizes parameters of the 3D geometry model based on a loss function to fine tune the facial expressions and orientation of the 3D geometry, thereby generating an updated 3D geometry 312. In some embodiments, the loss function includes a term that penalizes a difference between a mapping of the 3D geometry to a canonical space and mappings of 3D geometry associated with the face of the actor in other video frames to the canonical space. Such a loss function term is also referred to herein as a "canonical stability loss." In some embodiments, the canonical space can be an expression-free and translation/rotation-free space, such as a space corresponding to a frontal face view without expression. In some embodiments, the canonical stability loss can be computed by using optical flow to warp tracked 3D geometry (e.g., a tracked mesh) of a face from image space to a canonical position in the canonical space, and then computing a difference between the warped canonical faces associated with different video frames. If the 3D tracking is good, then the warped canonical face should be stable across video frames. Accordingly, the canonical stability loss can be used to improve 3D tracking accuracy by finding a fitting of the 3D geometry to video frames that results in a stable warped canonical face across frames. The 3D tracking results should then be relatively accurate and stable for those video frames. In some embodiments, the canonical stability loss can have the form:

$$\text{Canonical Stability Loss} = \underset{\theta}{\text{argmin}} \sum\nolimits_{t=1}^{T} (\text{warp}_{\theta}(\text{frame}_t) - \text{warp}_{\theta}(\text{frame}_{t-1})), \tag{1}$$

In equation (1), 0 represents the parameters of 3D geometry model (e.g., 3DMM).

In some embodiments, the loss function includes a term that penalizes differences between one or more landmarks on lips of the actor and one or more corresponding landmarks on lips associated with the 3D geometry. Such a loss function term is also referred to herein as a "lip distance loss," and the lip distance loss can align a degree to which a mouth of the 3D geometry is open or closed and a degree to which a detected mouth of the face of the actor is open or closed. In some embodiments, the lip distance loss uses landmarks on the lips of the face as supervision to force a tracked 3D geometry to pay more attention to lip regions, even when the lip movements are subtle. This is in contrast to conventional tracking approaches, which care less about lip regions that can be only a small proportion of each video frame. When actors speak fast, conventional tracking approaches can generate tracked 3D geometry that ignore subtle lip movements. In some embodiments, the lip distance loss can have the form:

$$\text{Lip Distance Loss} = \underset{\theta}{\text{argmin}} \sum\nolimits_{t=1}^{T} \left\| \text{lip\_lmk} \left( \text{vertex}_{\theta_t} \right) - \text{lip\_lmk\_detector} \left( \text{frame}_t \right) \right\|. \tag{2}$$

The vertex optimization module 316 is configured to optimize vertices of the 3D geometry 312 based on a loss function to further fine tune the facial expressions of the 3D geometry, thereby generating another updated 3D geometry 318. Conventional 3D geometry models, such as 3DMM, include parameters that can be adjusted for fitting to a face, but the parameters of conventional 3D geometry models have limited expressiveness. For example, conventional 3D geometry models are oftentimes unable to track the muscles, wrinkles, and other fine details of faces. Accordingly, after the landmark optimization module 304 and the canonical stability optimization module 308 fit a 3D geometry model, the vertex optimization module 316 frees the vertices of the 3D geometry and fits residual vertex displacements using a loss function to further improve the expressiveness (degrees of freedom) in the 3D tracking. In some embodiments, the vertex optimization module 316 can fit a displacement value for each vertex in the 3D geometry using the loss function.

In some embodiments, the loss function used by the vertex optimization module 316 includes the canonical stability loss and the lip distance loss, described above. In some embodiments, the loss function also includes a neural rendering loss term that penalizes differences between video frames and frames that are rendered using the 3D tracking results. In some embodiments, differentiable rendering can be used to render the 3D tracking results given 3D geometry, lighting, and texture.

In some embodiments, the loss function used by the vertex optimization module 316 also includes a term that penalizes differences between one or more landmarks on teeth of the actor and one or more corresponding landmarks associated with teeth in the 3D geometry. In such cases, the landmarks on the teeth of the actor can be obtained by inputting a video frame that includes the actor into a teeth landmarks detection model that outputs the landmarks on the teeth of the actor. The teeth landmarks detection model can be a machine learning model that is trained (e.g., by the model trainer 116) to detect landmarks on the teeth of faces using training data in which such landmarks are labeled in images of faces. In some embodiments, 3D geometry associated with teeth is split into upper, middle, and lower portions, and vertices of 3D geometry are tracked to be close to the detected teeth landmarks in each video frame.

In some embodiments, the loss function used by the vertex optimization module 316 also includes a term that penalizes a difference between landmarks detected on the face of an actor in a video frame, such as landmarks detected using the previously described machine learning model that is trained to detect landmarks, and corresponding landmarks associated with 3D geometry. In some embodiments, the loss function used by the vertex optimization module 316 can have the form:

$$Loss = \lambda_1 * landmark\_loss + \tag{3}$$
$$\lambda_2 * lip\_distance\_loss + \lambda_3 * canonical\_stability\_loss +$$
$$\lambda_4 * photo\_loss + \lambda_5 * temporal\_regularization\_loss,$$

where $\lambda_{1\text{-}5}$ are scalar weights that can vary in different stages of optimization and temporal_regularization_loss is a regularization term that penalizes high frequency changes in vertex positions to prevent the 3D geometry from changing too rapidly from frame to frame, which can appear noisy.

The lighting and texture optimization module 320 is configured to optimize lighting and a texture associated with the face in a video frame based on differences between the video frame and another frame that is rendered using lighting and texture that is estimated during the optimization. In some embodiments, the texture can indicate colors of the face in the video frame, such as skin color, eye color, lip color, eye shape, facial hair, etc. at each vertex of 3D geometry generated for the face. In some embodiments, the lighting can indicate the color of light and shadows on the face in the video frame, such as colors at each vertex of 3D geometry generated for the face. In some embodiments, the lighting can be represented using a Spherical Harmonic model that employs a vector to map a norm to a weight (dark or bright). Similar to the description above in conjunction with the vertex optimization module 316, the lighting and texture optimization module 320 can perform optimization of the lighting and texture using a loss function that also includes a neural rendering loss term that penalizes differences between original video frames and frames that are rendered using lighting and texture that is estimated during the optimization. In such cases, the lighting and texture optimization module 320 can render frames using the lighting and texture generated during the optimization process, compare the rendered frames with ground truth video frames to determine a difference, and backpropagate the difference to fine tune texture colors and lighting parameters such that rendered frames match the ground truth video frames. For a given ground truth video frame, the texture optimization module 320 can start from a gray lighting and a gray texture and then iteratively optimize the lighting and texture by modifying pixel values thereof, until a frame that is rendered using the lighting and texture matches the ground truth video frame.

Figure 4:
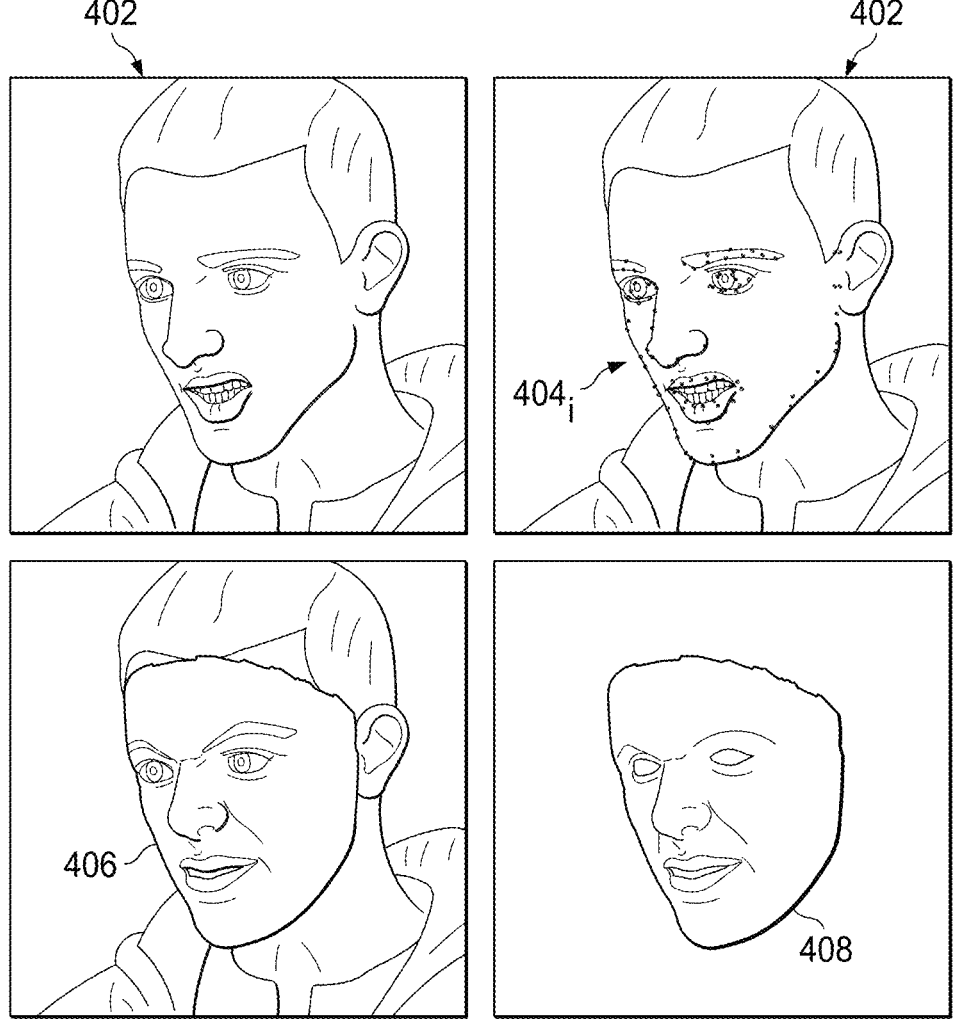
FIG. 4 illustrates an exemplar 3D geometry generated via 3D tracking, according to various embodiments.

FIG. 4 illustrates an exemplar 3D geometry generated via 3D tracking, according to various embodiments. As shown, given a video frame 402, the 3D tracking module 208 detects landmarks 404i (referred to herein collectively as landmarks 404 and individually as a landmark 404) in the video frame 402. Then, the 3D tracking module 208 fits a rough 3D geometry 408 of a face to the landmarks 404. Also shown is a rendering 406 of the face based on the rough 3D geometry 408.

Figure 5A:
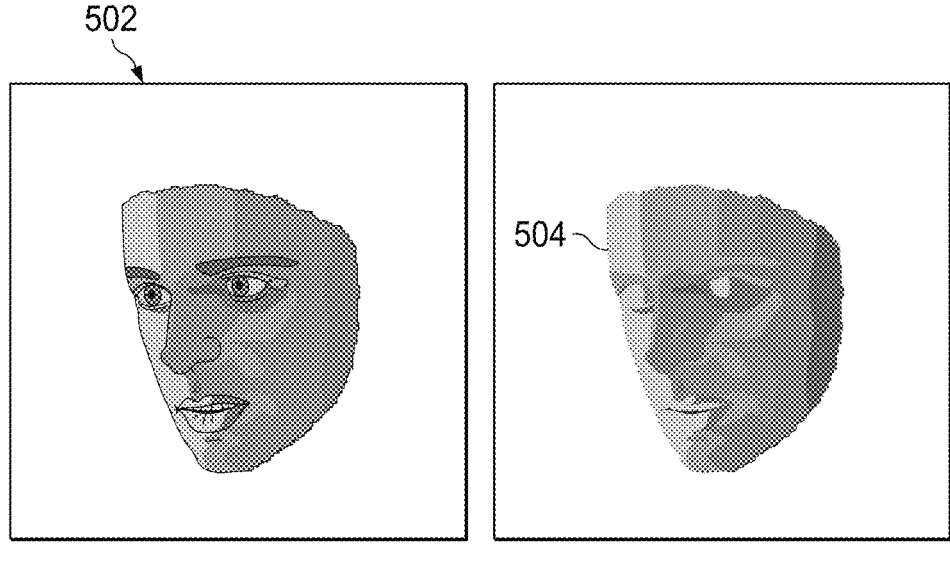
FIG. 5A illustrates how lighting for a face can be fit to a video frame, according to various embodiments.

FIG. 5A illustrates how lighting for a face can be fit to a video frame, according to various embodiments. As shown, the lighting and texture optimization module 320 can determine the lighting 504 associated with the face in a video frame 502. In some embodiments, to determine the lighting 504, the lighting and texture optimization module 320 can perform an iterative optimization technique that minimizes a loss that penalizes differences between renderings of the face using estimated lighting and the video frame 502 of the face, as described above in conjunction with FIG. 3.

Figure 5B:
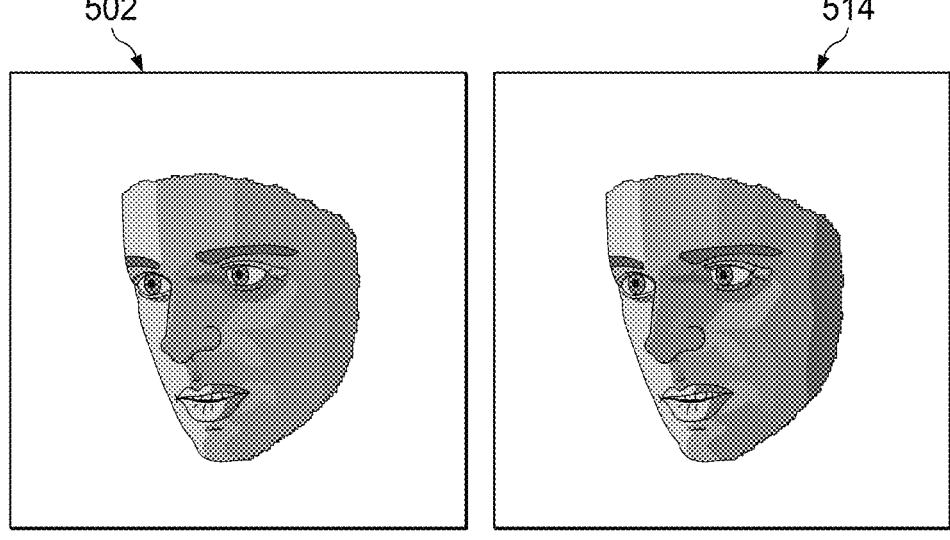
FIG. 5B illustrates how a texture for a face can be fit to a video frame, according to various embodiments.

FIG. 5B illustrates how a texture for a face can be fit to a video frame, according to various embodiments. As shown, the lighting and texture optimization module 320 can also determine a texture associated with the face in the video frame 502. The texture has been rendered along with 3D geometry and lighting in a frame 514. In some embodiments, to determine the texture, the lighting and texture optimization module 320 can perform an iterative optimization technique that minimizes a loss that penalizes differences between renderings of the face using an estimated texture and the video frame 502 of the face, as described above in conjunction with FIG. 3.

Figure 6:
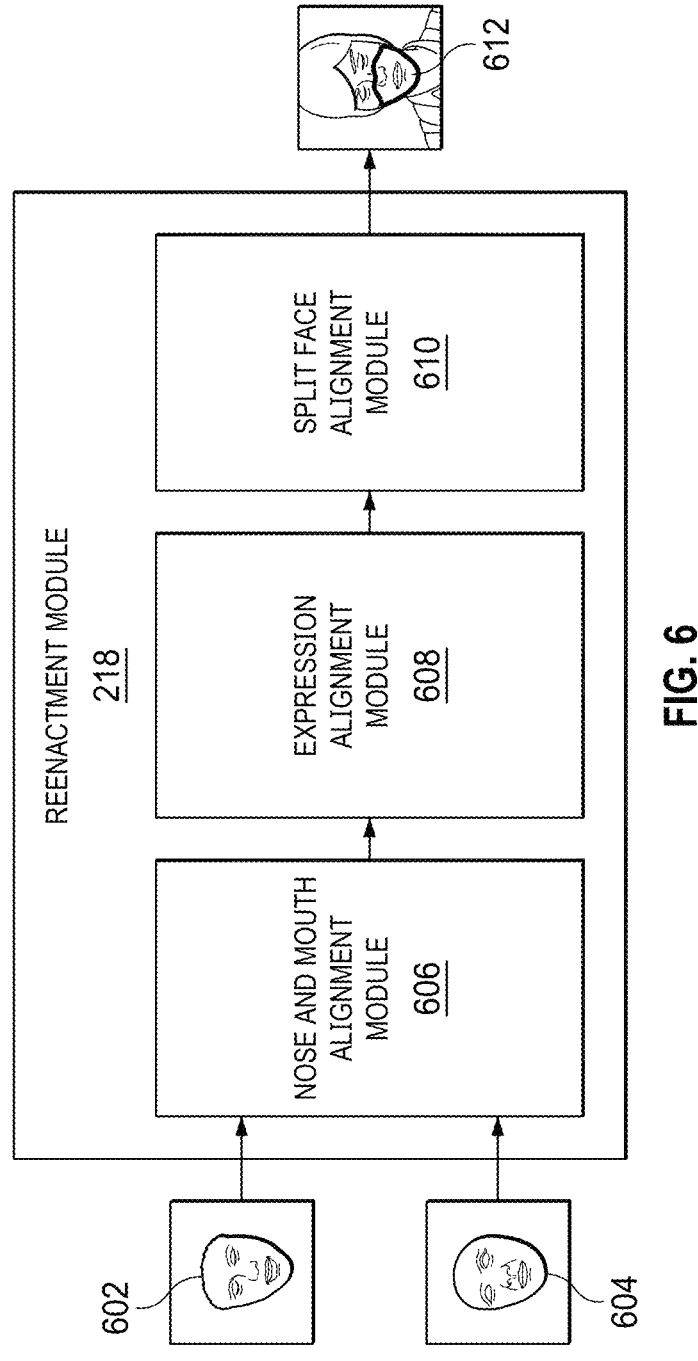
FIG. 6 illustrates in greater detail the reenactment module of FIG. 2, according to various embodiments.

FIG. 6 illustrates in greater detail the reenactment module 218 of FIG. 2, according to various embodiments. As shown, the reenactment module 218 includes a nose and mouth alignment module 606, an expression alignment module 608, and a split face alignment module 610. In operation, the reenactment module 218 takes as input 3D geometry associated with an actor, shown as 3D geometry 602, and 3D geometry associated with a dubber, shown as 3D geometry 604. Given such inputs, the reenactment module 218 outputs retargeted 3D geometry associated with the dubber, shown as 3D geometry 612 of a portion of the mouth, that is aligned with respect to the 3D geometry 602 associated with the actor.

The nose and mouth alignment module 606 aligns the nose and mouth positions of the 3D geometry associated with the dubber with the nose and mouth positions of the 3D geometry associated with the actor. In some embodiments, the nose and mouth alignment module 606 can perform an iterative optimization technique that minimizes a loss that penalizes misalignments between the nose and mouth portions of the 3D geometry 604 associated with the dubber and the nose and mouth positions of the 3D geometry 602 associated with the actor.

The expression alignment module 608 equalizes the scale of expressions of the 3D geometry associated with the dubber with the scale of expressions of the 3D geometry associated with the actor. In some embodiments, the expression alignment module 608 can perform an iterative optimization technique that minimizes a loss that penalizes differences between the scale of expressions of the 3D geometry 604 associated with the dubber and the scale of expressions of the 3D geometry 602 associated with the actor.

The split face alignment module 610 optimizes the expressions when the upper face is from the 3D geometry 602 associated with the actor and the lower face is from the 3D geometry 604 associated with the dubber. In some embodiments, the expression alignment module 608 can perform an iterative optimization technique that minimizes a loss that penalizes disconnected appearances between the upper face from the 3D geometry 602 associated with the actor and the lower face from the 3D geometry 604 associated with the dubber.

Figure 7:
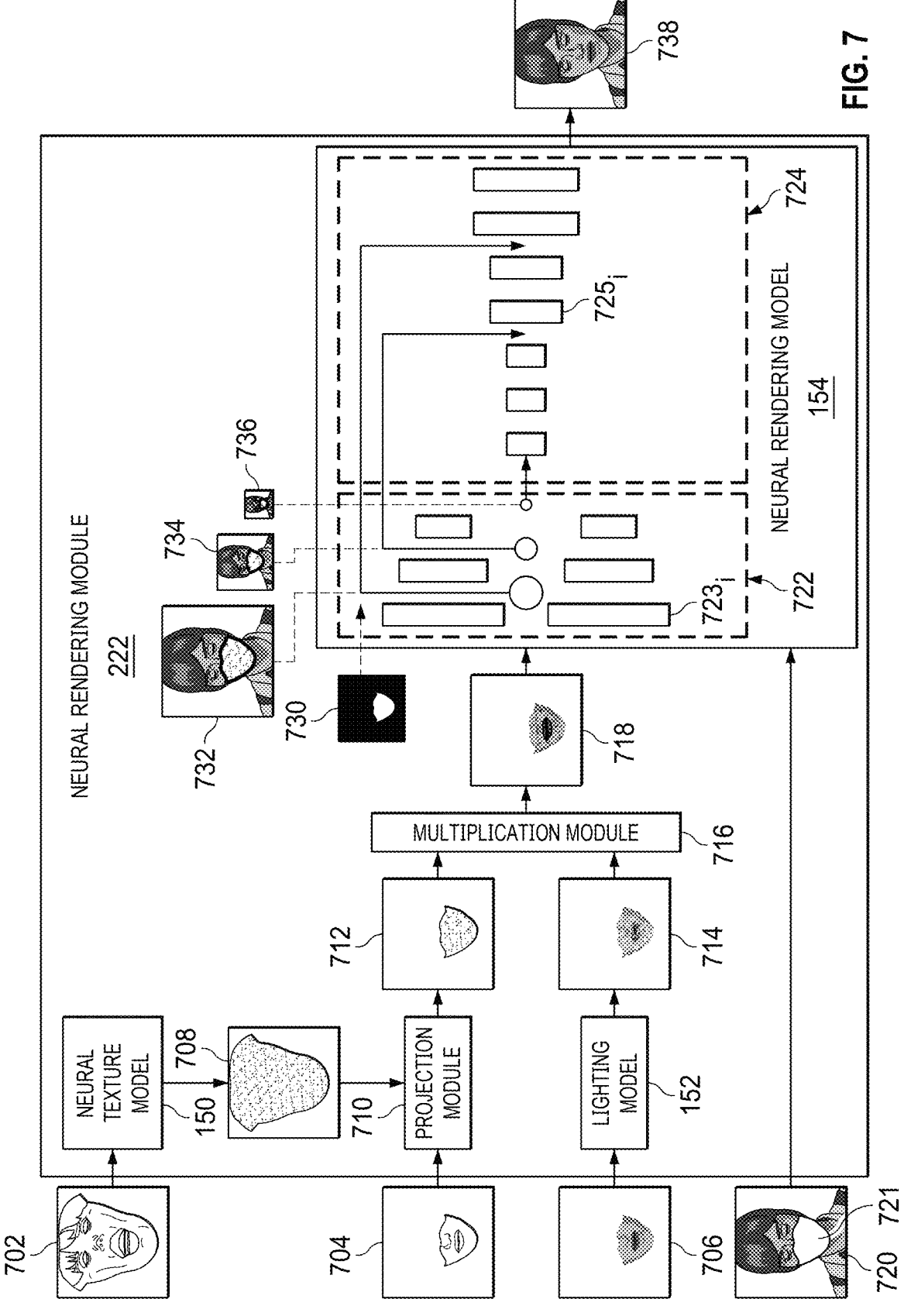
FIG. 7 illustrates in greater detail the neural rendering module of FIG. 2, according to various embodiments.

FIG. 7 illustrates in greater detail the neural rendering module 222 of FIG. 2, according to various embodiments. As shown, the neural rendering module 222 includes the neural texture model 150, a projection module 710, the lighting model 152, a multiplication module 716, and the neural rendering model 154. In operation, the neural rendering module 222 takes as input a texture 702 associated with an actor in a video frame 720, an aligned portion of 3D geometry 704 associated with a dubber in a corresponding video frame (not shown), lighting 706 associated with the actor in the video frame 720, the video frame 720 that includes the actor and a region 721 to be generated via neural rendering, and a mask 730 indicating which portion(s) of the video frame 720 the neural rendering model 154 should inpaint. In some embodiments, the texture 702, the aligned portion of 3D geometry 704, and the lighting 706 can be generated via the 3D tracking and reenactment techniques described above in conjunction with FIGS. 3-6. In some embodiments, the aligned portion of 3D geometry 704 can be in the form of a UV map. Given such inputs, the neural rendering module 222 generates a dubbed video frame 738 that includes a photorealistic depiction of the actor of the video frame 720 speaking another language that was spoken by the dubber in the corresponding video frame. It should be noted that the process of generating the dubbed video frame 738 is similar to graphics rendering, except the neural texture model 150, the lighting model 152, and the neural rendering model 154 are used to generate the dubbed video frame 738 rather than a ray tracing or rasterization technique. Further, it should be noted that, as the aligned portion of 3D geometry 704 is temporally coherent due to the 3D tracking using the canonical stability loss that is described above in conjunction with FIG. 3, the dubbed video frame 738 that is output by the neural rendering module 222 can also be temporally coherent and not include flickering or other artifacts when played back along with other dubbed video frames. In some embodiments, the video frame 720 can be a portion of a larger video frame that is cropped and centered around the face. Such cropping and centering are used to align video frames to a template that provides relatively uniform inputs, for which the neural rendering model 154 can more easily learn to generate outputs. The results generated via neural rendering (which are smaller than the original video frames) can then be composed with the original video frames to generate output video frames. In some embodiments, the cropping and centering can be performed using vertex positions from the tracked 3D geometry generated by the 3D tracking module 208, described above in conjunction with FIG. 3. In addition, mouth positions are easily affected by expressions and thus not stable for alignment, so vertices with no expressions can be used for mouths in some embodiments. More specifically, 3D vertices on the tracked 3D geometry that are projected to 2D can be used to calculate a similarity transform for alignment, and, when the 3D vertex positions are extracted, the expression can also be neutralized to ensure smooth alignment across frames, thereby preventing drastic changes in expressions from causing jitter in the alignment. In addition, instead of rotating and scaling the face, the face can be assumed to always maintain a consistent position while adjusting the camera accordingly given the transformation matrix. Doing so permits the alignment to accommodate profile faces. By contrast, conventional techniques that rely on facial landmarks are oftentimes unable to handle images of profile faces in which the landmarks are occluded and, therefore, cannot be detected in the images.

As shown, the neural rendering module 222 processes the texture 702 using the neural texture model 150 to generate a neural texture 708. The neural texture model 150 is a machine learning model, such as a convolutional neural network, that is trained to embed RGB (red, green, blue) textures in a latent space, thereby generating neural textures that have a higher dimensionality and can store more information than the RGB textures. Conventional models based on neural textures generally only work for one individual, as the neural texture used by such models preserves the unique appearance of a single individual. By contrast, the neural rendering module 222 takes RGB textures associated with different individuals as input, and the neural rendering module 222 projects such textures to higher-dimensional neural textures so that the uniqueness of the individuals is preserved in the neural textures while keeping the neural textures for different individuals in the same latent space. Illustratively, the projection module 710 takes as inputs the neural texture 708 and the aligned portion of 3D geometry 704 associated with the dubber, and the projection module 710 performs a grid sample look-up from the neural texture 708 to project the neural texture 708 onto the aligned portion of 3D geometry 704, thereby generating a projected embedding 712.

Similar to the generation of the neural texture 708 described above, the neural rendering module 222 processes the lighting 706 associated with the actor using the lighting model 152, which can be a trained machine learning model such as a convolutional neural network, to generate a neural lighting 714. Then, the multiplication module 716 multiplies the projected embedding 712 together with the neural lighting 714 to generate a lighted projected embedding 718. The neural rendering module 222 inputs the lighted projected embedding 718 along with the video frame 720 that includes the region 721 to be generated into the neural rendering model 154. The neural rendering module 222 also applies a mask 730, which indicates using different pixel values (e.g., 0 and 1) which portion(s) of the frame 720 are to be inpainted and which portion(s) are not to be inpainted, to the feature map space (rather than the RGB space). In some embodiments, the portion(s) to be inpainted can include a region around (e.g., a fixed distance surrounding) a region associated with the aligned portion of 3D geometry 704, such that the neural rendering model 154 (1) generates the region associated with the aligned portion of 3D geometry 704 based on the aligned portion of 3D geometry 704, and (2) inpaints the surrounding region to blend the neighboring pixel colors from the generated region and the video frame 720 so that there is relatively little discontinuity between the colors (or other artifacts). That is, the goal is to generate the lower jaw region of the face while ensuring that the generated results blend into the background seamlessly. To achieve such a goal, the neural rendering module 222 also inputs into the neural rendering model 154 the mask 730 that indicates which region to follow the aligned portion of 3D geometry 704 (animating) and which region to perform inpainting (seamless blend-in). In particular, the mask 730 can be input in feature space for the neural rendering model 154 to alpha-blend the features for animating and inpainting. In some embodiments, the mask 730 can also be dynamically eroded so that the neural rendering model 154 dynamically updates itself to regions that require inpainting and does not simply overfit.

Illustratively, for each layer 723*i* (referred to herein collectively as layers 723 and individually as a layer 723) of an encoder 722 of the neural rendering model 154, features extracted from the lighted projected embedding 718 are downsampled, and the mask 730 is also downsampled and applied to the feature space to generate blended features, shown as blended features 732, 734, and 736. In some embodiments, the blending can include an alpha blend of the downsampled mask with the downsampled features. That is, the encoder 722 of the neural rendering model 154 blends the features together and sends the blended features to a decoder 724 that includes a number of layers 725*i* (referred to herein collectively as layers 725 and individually as a layer 725) that decode the blended features to generate the dubbed video frame 738 that includes a photorealistic depiction of the actor of the video frame 720 speaking another language that was spoken by the dubber.

In some embodiments, one or more layers of the neural rendering model 154, the neural texture model 150, and the lighting model 152 can be trained (e.g., by the model trainer 116) in an end-to-end manner (i.e., together) using backpropagation with gradient descent and the following loss function:

$$\text{Loss} = \lambda_1 * L1\_\text{loss} + \lambda_2 * \text{discriminator\_los} + \lambda_3 * \text{regularizer\_loss}, \quad (4)$$

where $\lambda_1$, $\lambda_2$, and $\lambda_3$ can be, for example, $\lambda_1=0.1$, $\lambda_2=0.1$, and $\lambda_3=0.1$ and discriminator_loss is a conditional discriminator that penalizes faces of a given individual within generated frames that do not look like the given individual. In such cases, the training data can include ground truth video frames that are the expected output of the neural rendering model 154 as well as 3D geometry, textures, lighting, and masks for such video frames that are processed for input into the neural rendering model 154 in a similar manner as the aligned portion of 3D geometry 704, texture 702, lighting 706, and mask 730, described above. Given such inputs, output frames generated using the neural texture model 150, the lighting model 152, and the neural rendering model 154 can be compared with the ground truth video frames, and a difference between the output frames and the ground truth video frames can be used as a signal to update parameters of the neural texture model 150, the lighting model 152, and the neural rendering model 154. In some embodiments, the neural rendering model 154, the neural texture model 150, and the lighting model 152 can be trained using video frames from any number of scenes, including from an entire video, and the video frames can include any number of individuals, such as a single individual or multiple individuals. In some embodiments, one or more layers 725 of the decoder 724 can be pre-trained layers that are fixed during training of the neural rendering model 154, while one or more other layers 725 of the decoder 724 and layers 723 of the encoder 722 can be modified during training of the neural rendering model 154. In such cases, the one or more of layers 725 of the decoder 724 that are fixed can be layers of a pre-trained decoder, such as StyleGAN2, that was previously trained on a large number of faces and has a good knowledge of the human face prior that permits the pre-trained decoder to generate realistic images of faces. However, the pre-trained decoder may only be able to generate faces from random noise, without allowing the identity of the face to be controlled. By fixing the layers of the pre-trained decoder in the decoder 724 while allowing other layers 725 of the decoder 724 and the layers 723 of the encoder 722 to be modified during training, the neural rendering model 154 can be trained to generate photorealistic frames of faces having specific identities in a data efficient manner using, e.g., only a few seconds of video of each face having a specific identity under certain lighting conditions.

Figure 8:
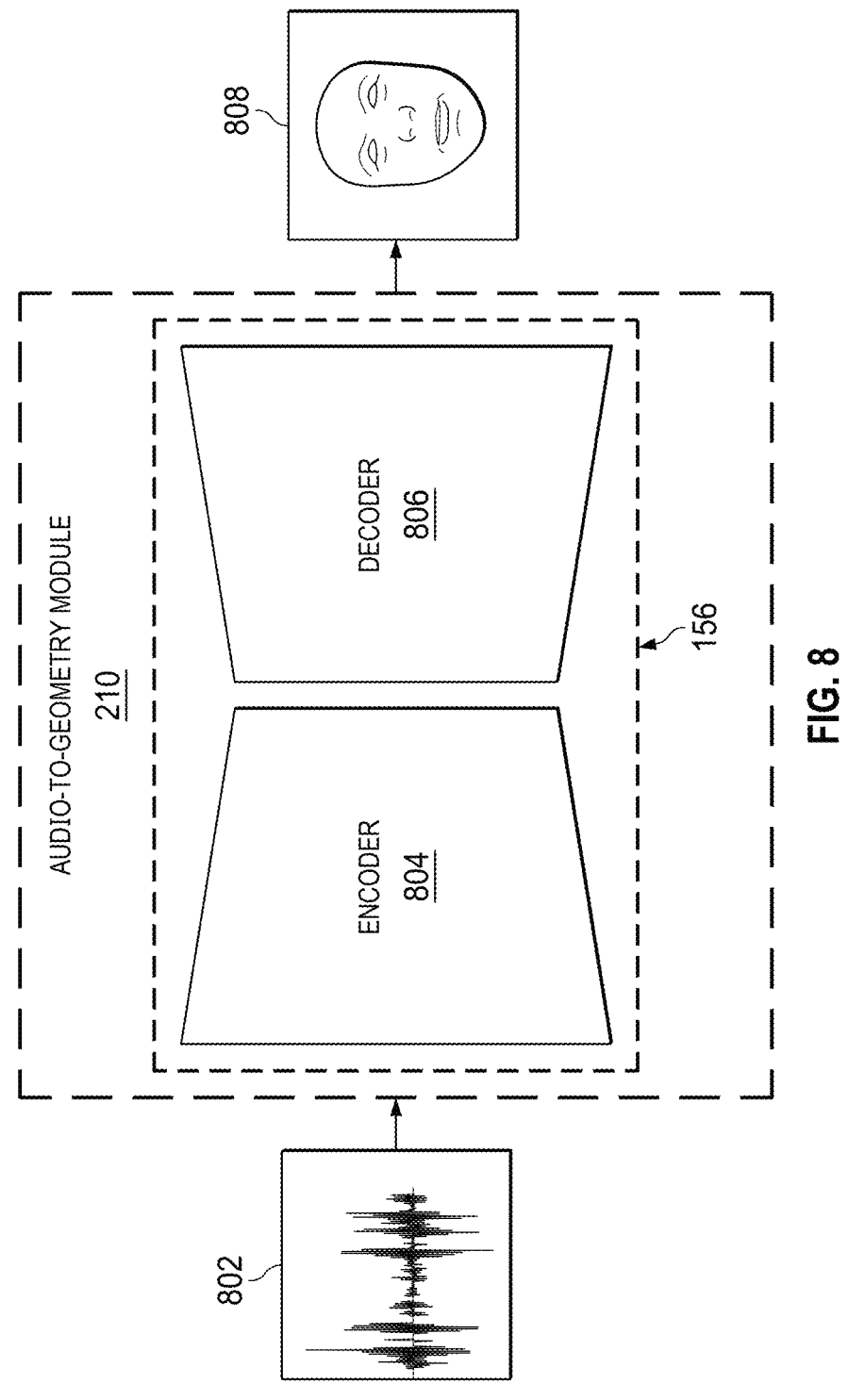
FIG. 8 illustrates in greater detail the audio-to-geometry module of FIG. 1, according to various other embodiments.

FIG. 8 illustrates in greater detail the optional audio-to-geometry module 210 of FIG. 2, according to various other embodiments. As shown, the audio-to-geometry module 210 includes the audio-to-expression model 156. The audio-to-expression model 156 is configured to convert audio, shown as audio 802, into corresponding 3D geometry of a face, shown as 3D geometry 808. The 3D geometry 808 can then be retargeted and used in neural rendering, similar to the 3D geometry 214 described above in conjunction with FIG. 2. For example, the audio-to-expression model 156 can be used when only audio, but not video, of a dubber is available. As another example, the audio-to-expression model 156 can be used when the dubber mumbles in a video and a more expressive dubbed media content item is desired.

Illustratively, the audio-to-expression model 156 is a machine learning model that includes an encoder 804 and a decoder 806. In operation, the encoder 804 encodes the audio 802 into an embedding in a latent space, and the decoder 806 decodes the embedding to generate the 3D geometry 808 of the face. In some embodiments, the encoder 804 can be a pre-trained model that was previously trained to encode audio features into a latent expression space. Using a pre-trained encoder 804 can reduce the amount of training data and the training time that is required to train the audio-to-expression model 156. Further, the decoder 806 can be a model that is trained (e.g., by the model trainer 116) to decode embeddings in the latent expression space to 3D geometry using as training data (1) 3D geometry of faces of multiple individuals speaking in different languages, which can be tracked in a number of videos (e.g., 100 videos lasting 2-5 seconds each) and projected to a canonical space; and (2) embeddings of audio associated with those videos. In some embodiments, the decoder 806 can be any technically feasible type of machine learning model, such as a long short term memory (LSTM) neural network, a sequential decoder, a transformer, a recurrent neural network (RNN), etc. In some embodiments, the decoder 806 can be trained in an auto-regressive manner, during which an output of the decoder 806 for each video frame is input along with an embedding associated with a next video frame into the decoder 806. Experience has shown that a decoder trained in such an auto-regressive manner can generate more expressive (as opposed to robotic) 3D geometry of faces.

Figure 9:
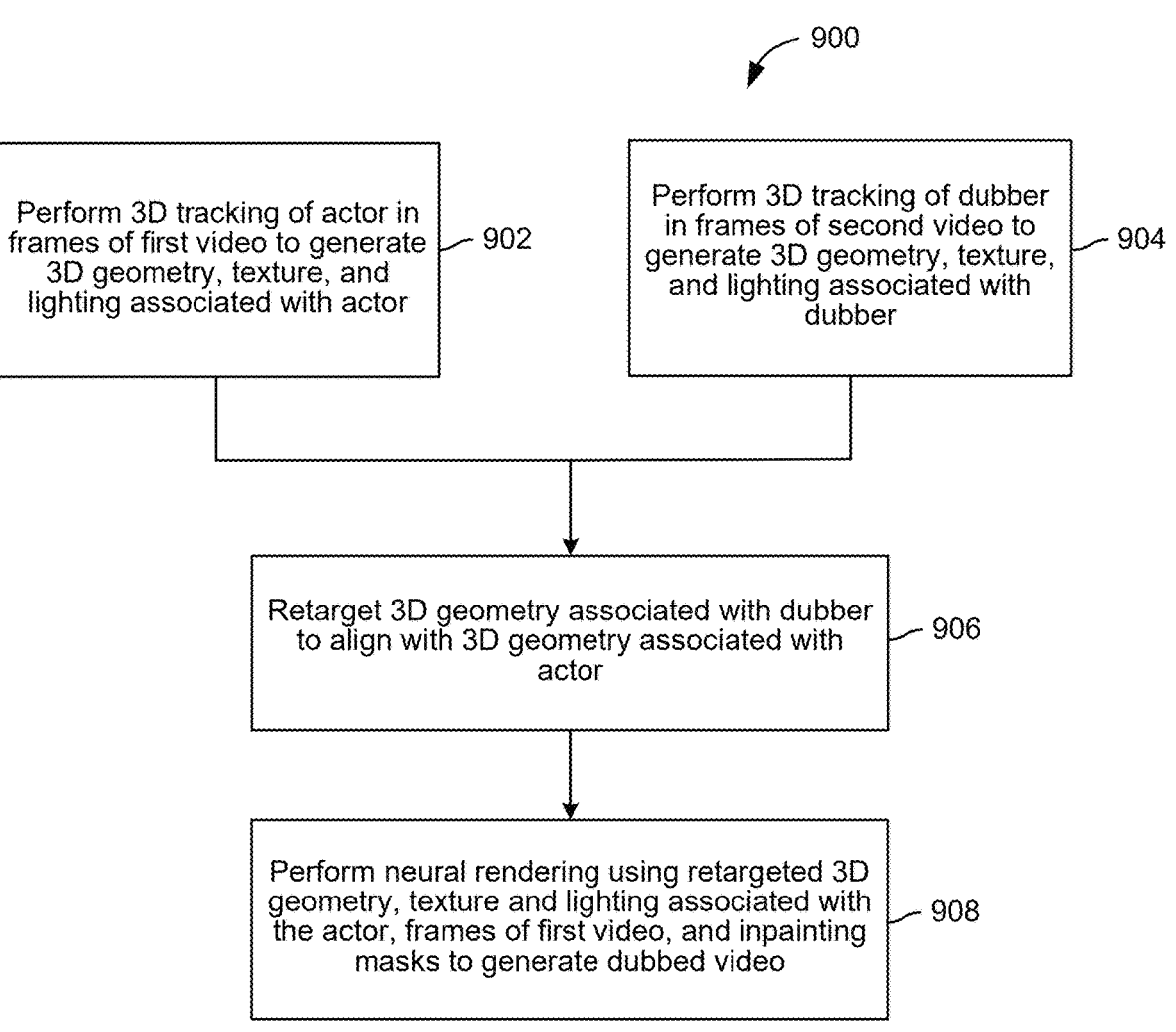
FIG. 9 is a flow diagram of method steps for generating a dubbed media content item, according to various embodiments.

FIG. 9 is a flow diagram of method steps for generating a dubbed media content item, according to various embodiments. Although the method steps are described with reference to the systems of FIGS. 1-3 and 6-8, persons skilled in the art will understand that any system configured to implement the method steps, in any order, falls within the scope of the present disclosure.

As shown, a method 900 begins at step 902, where the dubbing application 146 performs 3D tracking of an actor in the frames of a first video to generate 3D geometry, texture, and lighting associated with the actor. In some embodiments, the dubbing application 146 can perform 3D tracking of the actor according to the steps discussed below in conjunction with FIG. 10.

At step 904, the dubbing application 146 performs 3D tracking of a dubber in the frames of a second video to generate 3D geometry, texture, and lighting associated with the dubber. Step 904 is similar to step 902, except 3D tracking is performed for the dubber rather than the actor.

At step 906, the dubbing application 146 retargets the 3D geometry associated with the dubber to align with the 3D geometry associated with the actor. In some embodiments, the dubbing application 146 can perform retargeting according to the steps discussed below in conjunction with FIG. 11.

At step 908, the dubbing application 146 performs neural rendering using the retargeted 3D geometry, the texture and lighting associated with the actor, the frames of the first video, and corresponding inpainting masks, to generate a dubbed media content item. In some embodiments, the dubbing application 146 can perform neural rendering according to the steps discussed below in conjunction with FIG. 12.

Figure 10:
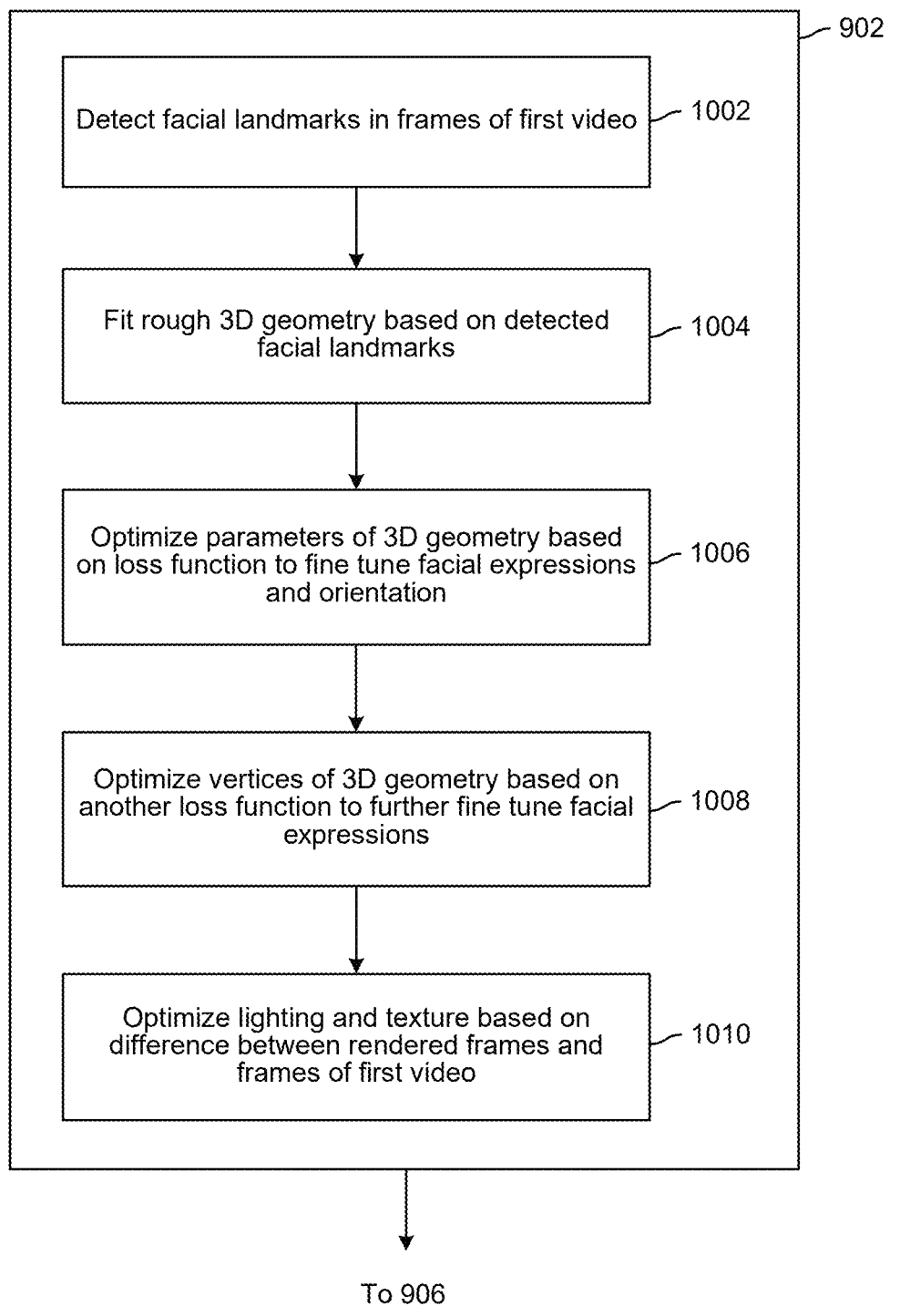
FIG. 10 is a flow diagram of method steps for performing 3D tracking of an actor across multiple frames of a video, according to various embodiments.

FIG. 10 is a flow diagram of method steps for performing 3D tracking in step 902 of FIG. 9, according to various embodiments. Although the method steps are described with reference to the systems of FIGS. 1-3 and 6-8, persons skilled in the art will understand that any system configured to implement the method steps, in any order, falls within the scope of the present disclosure.

As shown, at step 1002, the dubbing application 146 detects facial landmarks in the frames of a first video. In some embodiments, the facial landmarks can be detected in any technically feasible manner, such as using a trained machine learning model (e.g., a transformer-based facial landmark detection network), and any suitable landmarks can be detected.

At step 1004, the dubbing application 146 fits a rough 3D geometry based on the detected facial landmarks. In some embodiments, the dubbing application 146 can fit a 3D geometry model that defines the rough 3D geometry by changing weight parameters of the 3D geometry model such that landmarks associated with the 3D geometry align with corresponding landmarks that were detected at step 1002, as described above in conjunction with FIG. 3

At step 1006, the dubbing application 146 optimizes parameters of the 3D geometry based on a loss function to fine tune the facial expressions and orientation of the 3D geometry. In some embodiments, an iterative optimization technique can be performed, and the loss function can include a canonical stability loss and a distance loss, as described above in conjunction with FIG. 3.

At step 1008, the dubbing application 146 optimizes vertices of the 3D geometry based on another loss function to further fine tune the facial expressions of the 3D geometry. In some embodiments, an iterative optimization technique can be performed, and the other loss function can include a canonical stability loss, a distance loss, a neural rendering loss, a term that penalizes differences between one or more landmarks on teeth of the actor and one or more corresponding landmarks associated with teeth in the 3D geometry, and/or a term that penalizes a difference between landmarks detected on the face of an actor in a video frame and corresponding landmarks associated with the 3D geometry, as described above in conjunction with FIG. 3.

At step 1010, the dubbing application 146 optimizes lighting and a texture based on differences between frames that are rendered using light and texture estimated during the optimization and frames of the first video. In some embodiments, the dubbing application 146 can render frames using the lighting and texture generated during the optimization process, compare the rendered frames with ground truth video frames from the first video to determine a difference, and backpropagate the difference to fine tune texture, colors, and lighting parameters such that rendered frames match the ground truth video frames of the first video, as described above in conjunction with FIG. 3.

FIG. 11 is a flow diagram of method steps for retargeting 3D geometry associated with a dubber in step 906 of FIG. 9, according to various embodiments. Although the method steps are described with reference to the systems of FIGS. 1-3 and 6-8, persons skilled in the art will understand that any system configured to implement the method steps, in any order, falls within the scope of the present disclosure.

As shown, at step 1102, the dubbing application 146 aligns the nose and mouth positions of the 3D geometry associated with the dubber with the nose and mouth positions of the 3D geometry associated with the actor. In some embodiments, the dubbing application 146 can perform an iterative optimization technique that minimizes a loss that penalizes misalignments between the nose and mouth portions of the 3D geometry associated with the dubber and the nose and mouth positions of the 3D geometry associated with the actor, as described above in conjunction with FIG. 6.

At step 1104, the dubbing application 146 equalizes the scale of expressions of the 3D geometry associated with the dubber with the scale of expressions of the 3D geometry associated with the actor. In some embodiments, the dubbing application 146 can perform an iterative optimization technique that minimizes a loss that penalizes differences between the scale of expressions of the 3D geometry associated with the dubber and the scale of expressions of the 3D geometry associated with the actor, as described above in conjunction with FIG. 6.

At step 1106, the dubbing application 146 optimizes the expressions when the upper face is from the 3D geometry associated with the actor and the lower face is from the 3D geometry associated with the dubber. In some embodiments, the dubbing application 146 can perform an iterative optimization technique that minimizes a loss that penalizes disconnected appearances between the upper face from the 3D geometry associated with the actor and the lower face from the 3D geometry associated with the dubber, as described above in conjunction with FIG. 6.

Figure 12:
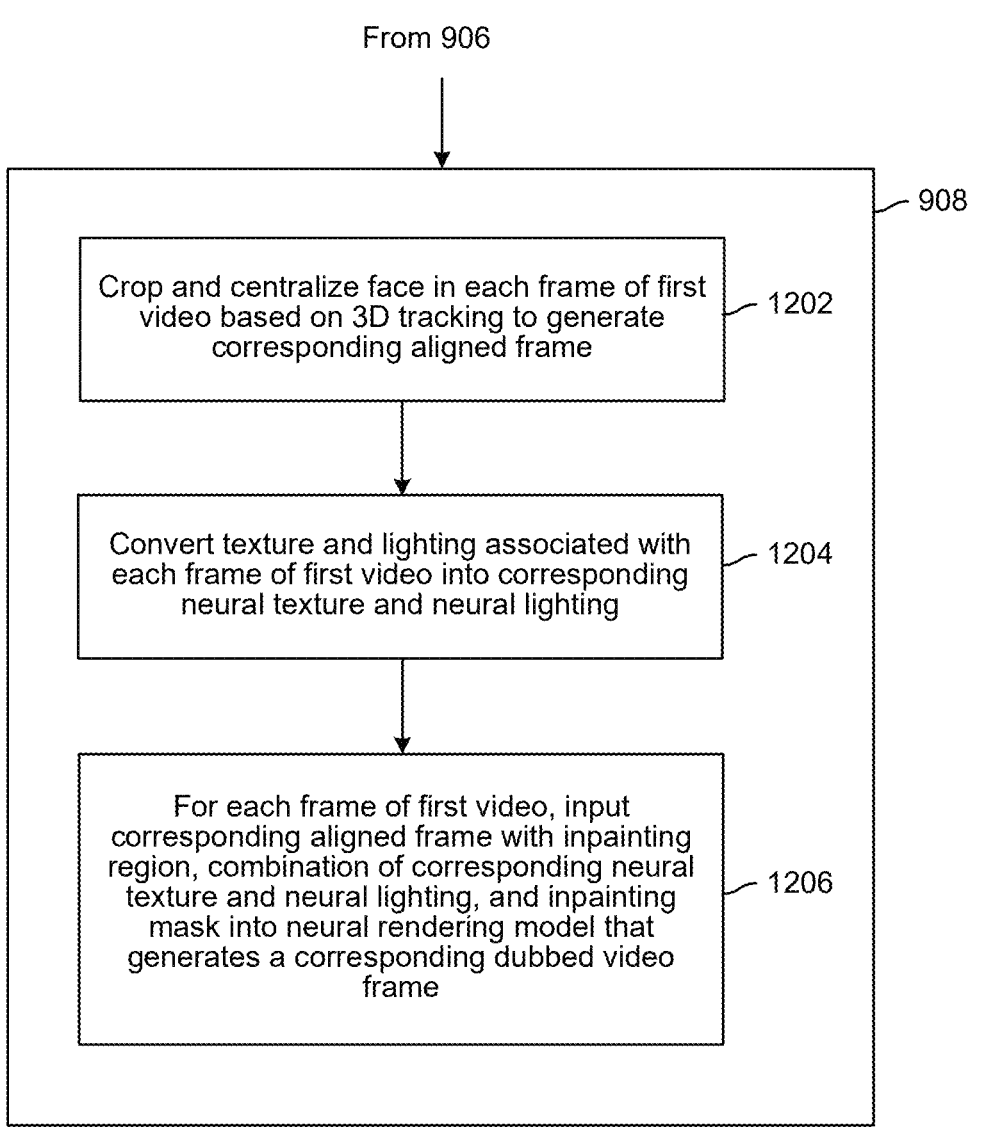
FIG. 12 is a flow diagram of method steps for performing neural rendering to generate dubbed frames of a video, according to various embodiments.

FIG. 12 is a flow diagram of method steps for performing neural rendering in step 908 of FIG. 9, according to various embodiments. Although the method steps are described with reference to the systems of FIGS. 1-3 and 6-8, persons skilled in the art will understand that any system configured to implement the method steps, in any order, falls within the scope of the present disclosure.

As shown, at step 1202, the dubbing application 146 crops and centralizes the face in each frame of the first video based on results of the 3D tracking performed at step 902 to generate a corresponding aligned frame. In some embodiments, the dubbing application 146 can crop and centralize the face in each frame of the first video according to techniques described above in conjunction with FIG. 7.

At step 1204, the dubbing application 146 converts the texture and lighting associated with each frame of the first video into a corresponding neural texture and a corresponding neural lighting, respectively. In some embodiments, the dubbing application 146 can process the texture and lighting using trained machine learning models (e.g., trained convolutional neural networks) that generate the corresponding neural texture and corresponding neural lighting, as described above in conjunction with FIG. 8.

At step 1206, for each frame of the first video, the dubbing application 146 inputs the corresponding aligned frame, a combination of the corresponding neural texture and neural lighting, and an inpainting mask into the neural rendering model 154, which generates a corresponding dubbed media content item frame. In some embodiments, the dubbing application 146 can process each frame of the first video, the corresponding aligned frame, the combination of the corresponding neural texture and neural lighting, and the inpainting mask using the neural rendering model 154 according to the techniques described above in conjunction with FIG. 7.

Figure 13:
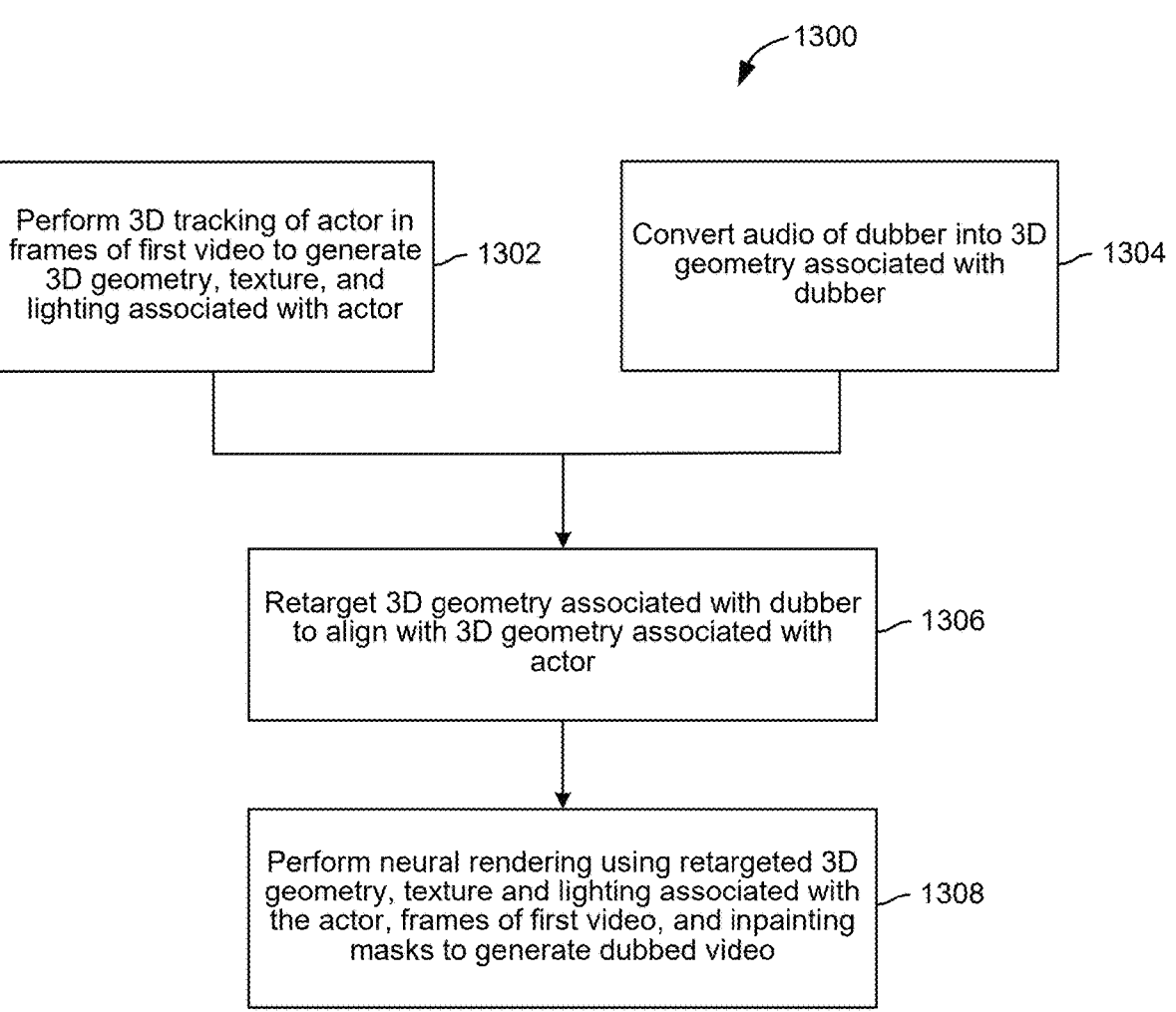
FIG. 13 is a flow diagram of method steps for generating a dubbed media content item using audio input, according to various embodiments.

FIG. 13 is a flow diagram of method steps for generating a dubbed media content item using audio input, according to various embodiments. Although the method steps are described with reference to the systems of FIGS. 1-3 and 6-8, persons skilled in the art will understand that any system configured to implement the method steps, in any order, falls within the scope of the present disclosure.

As shown, a method 1300 begins at step 1302, where the dubbing application 146 performs 3D tracking of an actor in the frames of a first video to generate 3D geometry, texture, and lighting associated with the actor. Step 1302 is similar to step 902 of the method 900, described above in conjunction with FIG. 9.

At step 1304, the dubbing application 146 converts audio of a dubber into 3D geometry associated with the dubber. In some embodiments, the dubbing application 146 can input the audio of the dubber into the audio-to-expression model 156 that generates the 3D geometry associated with the dubber.

At step 1306, the dubbing application 146 retargets the 3D geometry associated with the dubber to align with the 3D geometry associated with the actor. Step 1306 is similar to step 906 of the method 900, described above in conjunction with FIG. 9.

At step 1308, the dubbing application 146 performs neural rendering using the retargeted 3D geometry, the texture and lighting associated with the actor, the frames of the first video, and corresponding inpainting masks to generate a dubbed media content item. Step 1308 is similar to step 908 of the method 900, described above in conjunction with FIG. 9.

In sum, techniques are disclosed for generating dubbed media content items by modifying the pixels of original media content items to match audio in a different language than the original media content items. In some embodiments, a dubbing application performs 3D tracking of (1) the face of an actor within video frames of a first media content item in order to generate 3D geometry representing the face of the actor in each video frame of the first media content item, and (2) the face of a dubber within video frames of a second media content item in order to generate 3D geometry representing the face of the dubber in each video frame of the second media content item. The dubbing application also tracks the texture and lighting of the face of the actor in each video frame of the first media content item. Subsequent to the 3D tracking, the dubbing application aligns the 3D geometry of the face of the dubber with the 3D geometry of the face of the actor to generate aligned 3D geometry of the dubber. Then, the dubbing application performs neural rendering via a trained machine learning model to generate dubbed video frames using the aligned 3D geometry of the dubber, the texture and lighting of the face of the actor, the video frames of the first media content item, and masks indicating which region(s) of the video frames are to be inpainted. In some embodiments, when only audio of the dubber is available, the dubbing application can convert the audio into 3D geometry that is used, instead of 3D geometry that is determined via the above 3D tracking technique, to generate a dubbed media content item.

At least one technical advantage of the disclosed techniques relative to the prior art is that the disclosed techniques can be used to generate dubbed media content items that include photorealistic videos that closely match dubbed audio in a different language. The disclosed techniques are also, as a general matter, faster than conventional graphics rendering techniques for rendering faces. In addition, the disclosed techniques do not require a facial capture system to generate dubbed media content items. Accordingly, the disclosed techniques can be implemented in post production to generate photorealistic dubbed media content that is more enjoyable to viewers than traditional dubbed media content. These technical advantages represent one or more technological improvements over prior art approaches.

1. In some embodiments, a computer-implemented method for generating dubbed media content items comprises generating first three-dimensional (3D) geometry, a texture map, and a lighting map based on a face of an actor included in a first video frame of a first media content item, generating second 3D geometry based on a face of a dubber included in a second video frame of a second media content item, performing one or more operations that align the second 3D geometry with the first 3D geometry to generate an aligned second 3D geometry, and performing one or more operations via one or more trained machine learning models to render a third video frame based on the aligned second 3D geometry, the texture map, the lighting map, and the first video frame of the first media content item.

2. The computer-implemented method of clause 1, wherein generating the first 3D geometry comprises detecting a plurality of landmarks on the face of the actor included in the first video frame, performing one or more operations to fit an intermediate 3D geometry to the plurality of landmarks, and performing one or more optimization operations to update the intermediate geometry based on the first video frame and one or more loss functions.

3. The computer-implemented method of clauses 1 or 2, wherein the one or more loss functions penalize a difference between a mapping of the intermediate 3D geometry to a canonical space and one or more other mappings of one or more other 3D geometries associated with the face of the actor to the canonical space.

4. The computer-implemented method of any of clauses 1-3, wherein the one or more loss functions penalize one or more differences between one or more landmarks on lips of the actor included in the first video frame and one or more corresponding landmarks on lips associated with the intermediate 3D geometry.

5. The computer-implemented method of any of clauses 1-4, wherein the one or more loss functions penalize one or more differences between one or more landmarks on teeth of the actor included in the first video frame and one or more corresponding landmarks on teeth associated with the intermediate 3D geometry.

6. The computer-implemented method of any of clauses 1-5, wherein the one or more loss functions penalize a difference between a degree to which a mouth associated with the intermediate 3D geometry is closed and a degree to which a detected mouth of the face of the actor included in the first video frame is closed.

7. The computer-implemented method of any of clauses 1-6, wherein the one or more loss functions penalize a difference between the plurality of landmarks on the face of the actor included in the first video frame and a plurality of corresponding landmarks associated with the intermediate 3D geometry.

8. The computer-implemented method of any of clauses 1-7, wherein the texture map and the lighting map are generated based on a loss function that penalizes a difference between the first video frame and a fourth video frame that has been rendered using the texture map and the lighting map.

9. The computer-implemented method of any of clauses 1-8, wherein performing the one or more operations that align the second 3D geometry with the first 3D geometry comprises performing one or more operations to align a nose position and a mouth position associated with the second 3D geometry with a nose position and a mouth position associated with the first 3D geometry, performing one or more operations to equalize a scale of one or more expressions associated with the second 3D geometry with a scale of one or more expressions associated with the first 3D geometry, and performing one or more optimization operations to determine the one or more expressions associated with the second 3D geometry when combining a bottom portion of the second 3D geometry with a top portion of the first 3D geometry.

10. The computer-implemented method of any of clauses 1-9, wherein performing the one or more operations to render the third video frame comprises performing one or more operations to convert the texture map to a neural texture, performing one or more operations to convert the lighting map to a neural lighting, and processing, using a first trained machine learning model, the aligned second 3D geometry, the first video frame, a mask indicating one or more regions of the first video frame to be inpainted, and a combination of the neural texture and the neural lighting to generate the third video frame.

11. In some embodiments, one or more non-transitory computer-readable media store instructions that, when executed by at least one processor, cause the at least one processor to perform steps comprising generating first three-dimensional (3D) geometry, a texture map, and a lighting map based on a face of an actor included in a first video frame of a first media content item, generating second 3D geometry based on a face of a dubber included in a second video frame of a second media content item, performing one or more operations that align the second 3D geometry with the first 3D geometry to generate an aligned second 3D geometry, and performing one or more operations via one or more trained machine learning models to render a third video frame based on the aligned second 3D geometry, the texture map, the lighting map, and the first video frame of the first media content item.

12. The one or more non-transitory computer-readable media of clause 11, wherein generating the first 3D geometry comprises detecting a plurality of landmarks on the face of the actor included in the first video frame, performing one or more operations to fit an intermediate 3D geometry to the plurality of landmarks, and performing one or more optimization operations to update the intermediate geometry based on the first video frame and one or more loss functions.

13. The one or more non-transitory computer-readable media of clauses 11 or 12, wherein the one or more loss functions penalize a difference between a mapping of the intermediate 3D geometry to a canonical space and one or more other mappings of one or more other 3D geometries associated with the face of the actor to the canonical space.

14. The one or more non-transitory computer-readable media of any of clauses 11-13, wherein the one or more loss functions penalize one or more differences between one or more landmarks on at least one of lips or teeth of the actor included in the first video frame and one or more corresponding landmarks on at least one of lips or teeth associated with the intermediate 3D geometry.

15. The one or more non-transitory computer-readable media of any of clauses 11-14, wherein performing the one or more operations that align the second 3D geometry with the first 3D geometry comprises performing one or more operations to align a nose position and a mouth position associated with the second 3D geometry with a nose position and a mouth position associated with the first 3D geometry, performing one or more operations to equalize a scale of one or more expressions associated with the second 3D geometry with a scale of one or more expressions associated with the first 3D geometry, and performing one or more optimization operations to determine the one or more expressions associated with the second 3D geometry when combining a bottom portion of the second 3D geometry with a top portion of the first 3D geometry.

16. The one or more non-transitory computer-readable media of any of clauses 11-15, wherein performing the one or more operations to render the third video frame comprises performing one or more operations to convert the texture map to a neural texture, performing one or more operations to convert the lighting map to a neural flighting, and processing, using a first trained machine learning model, the aligned second 3D geometry, the first video frame, a mask indicating one or more regions of the first video frame to be inpainted, and a combination of the neural texture and the neural lighting to generate the third video frame.

17. The one or more non-transitory computer-readable media of any of clauses 11-16, wherein performing the one or more operations to render the third video frame further comprises performing one or more operations to crop and center the face of the actor in the first video frame based on the first 3D geometry.

18. The one or more non-transitory computer-readable media of any of clauses 11-17, wherein the mask is applied to one or more feature spaces of the first trained machine learning model.

19. The one or more non-transitory computer-readable media of any of clauses 11-18, wherein the first trained machine learning model comprises an encoder network and a decoder network.

20. In some embodiments, a system comprises a memory storing instructions, and a processor that is coupled to the memory and, when executing the instructions, is configured to perform the steps of generating first three-dimensional (3D) geometry, a texture map, and a lighting map based on a face of an actor included in a first video frame of a first media content item, generating second 3D geometry based on a face of a dubber included in a second video frame of a second media content item, performing one or more operations that align the second 3D geometry with the first 3D geometry to generate an aligned second 3D geometry, and performing one or more operations via one or more trained machine learning models to render a third video frame based on the aligned second 3D geometry, the texture map, the lighting map, and the first video frame of the first media content item.

1. In some embodiments, a computer-implemented method for tracking faces within video frames comprises detecting a plurality of landmarks on a face included in a video frame, performing one or more operations to fit a first 3D geometry to the plurality of landmarks, wherein the first 3D geometry is defined using one or more parameters, and performing one or more operations to modify the one or more parameters based on the video frame and a first loss function to generate a second 3D geometry.

2. The computer-implemented method of clause 1, wherein the first loss function penalizes a difference between a mapping of the first 3D geometry to a canonical space and one or more other mappings of one or more other 3D geometries associated with the face in one or more other video frames to the canonical space.

3. The computer-implemented method of clauses 1 or 2, wherein the first loss function penalizes one or more differences between one or more landmarks on lips of the face included in the video frame and one or more corresponding landmarks on lips associated with the first 3D geometry.

4. The computer-implemented method of any of clauses 1-3, wherein the second 3D geometry comprises a plurality of vertices, and further comprising performing one or more operations to modify one or more positions of one or more vertices included in the plurality of vertices based on the video frame and a second loss function to generate a third 3D geometry.

5. The computer-implemented method of any of clauses 1-4, wherein the second loss function includes at least one term included in the first loss function.

6. The computer-implemented method of any of clauses 1-5, wherein the second loss function penalizes one or more differences between one or more landmarks on teeth of the face included in the video frame and one or more corresponding landmarks on teeth associated with the second 3D geometry.

7. The computer-implemented method of any of clauses 1-6, wherein the second loss function penalizes a difference between a degree to which a mouth associated with the second 3D geometry is closed and a degree to which a detected mouth associated with the face included in the video frame is closed.

8. The computer-implemented method of any of clauses 1-7, wherein the second loss function penalizes one or more differences between the plurality of landmarks on the face included in the video frame and a plurality of corresponding landmarks associated with the second 3D geometry.

9. The computer-implemented method of any of clauses 1-8, wherein the second loss function penalizes a difference between the video frame and another video frame that has been rendered using the second 3D geometry.

10. The computer-implemented method of any of clauses 1-9, further comprising performing one or more operations to generate a dubbed media content item based on the third 3D geometry.

11. The computer-implemented method of any of clauses 1-10, further comprising performing one or more operations to generate at least one of a texture map or a lighting map based on the face included in the video frame and a second loss function that penalizes a difference between the video frame and another video frame that has been rendered using the at least one of a texture map or a lighting map.

12. In some embodiments, one or more non-transitory computer-readable media store instructions that, when executed by at least one processor, cause the at least one processor to perform steps comprising detecting a plurality of landmarks on a face included in a video frame, performing one or more operations to fit a first 3D geometry to the plurality of landmarks, wherein the first 3D geometry is defined using one or more parameters, and performing one or more operations to modify the one or more parameters based on the video frame and a first loss function to generate a second 3D geometry.

13. The one or more non-transitory computer-readable media of clause 12, wherein the first loss function penalizes a difference between a mapping of the first 3D geometry to a canonical space and one or more other mappings of one or more other 3D geometries associated with the face in one or more other video frames to the canonical space.

14. The one or more non-transitory computer-readable media of clauses 12 or 13, wherein the first loss function penalizes one or more differences between one or more landmarks on lips of the face included in the video frame and one or more corresponding landmarks on lips associated with the first 3D geometry.

15. The one or more non-transitory computer-readable media of any of clauses 12-14, wherein the second 3D geometry comprises a plurality of vertices, and the instructions, when executed by the at least one processor, cause the at least one processor to perform the step of performing one or more operations to modify one or more positions of one or more vertices included in the plurality of vertices based on the video frame and a second loss function to generate a third 3D geometry.

16. The one or more non-transitory computer-readable media of any of clauses 12-15, wherein the second loss function penalizes one or more differences between one or more landmarks on teeth of the face included in the video frame and one or more corresponding landmarks on teeth associated with the second 3D geometry.

17. The one or more non-transitory computer-readable media of any of clauses 12-16, wherein the second loss function penalizes a difference between a degree to which a mouth associated with the second 3D geometry is closed and a degree to which a detected mouth associated with the face included in the video frame is closed.

18. The one or more non-transitory computer-readable media of any of clauses 12-17, wherein the second loss function penalizes one or more differences between the plurality of landmarks on the face included in the video frame and a plurality of corresponding landmarks associated with the second 3D geometry.

19. The one or more non-transitory computer-readable media of any of clauses 12-18, wherein the second loss function penalizes a difference between the video frame and another video frame that has been rendered using the second 3D geometry.

20. In some embodiments, a system comprises a memory storing instructions, and a processor that is coupled to the memory and, when executing the instructions, is configured to perform the steps of detecting a plurality of landmarks on a face included in a video frame, performing one or more operations to fit a first 3D geometry to the plurality of landmarks, wherein the first 3D geometry is defined using one or more parameters, and performing one or more operations to modify the one or more parameters based on the video frame and a first loss function to generate a second 3D geometry.

1. In some embodiments, a computer-implemented method for rendering an image of a face comprises performing one or more operations to convert a texture map associated with the face to a neural texture map, and performing, via a first trained machine learning model, one or more operations to generate the image of the face based on the neural texture map and first 3D geometry associated with the face.

2. The computer-implemented method of clause 1, further comprising performing one or more operations to convert a lighting map associated with the face to a neural lighting map, wherein the image of the face is further generated based on the neural lighting map.

3. The computer-implemented method of clauses 1 or 2, wherein the first trained machine learning model comprises an encoder that encodes the neural texture map and the first 3D geometry to an embedding, and a decoder that decodes the embedding to generate the image of the face.

4. The computer-implemented method of any of clauses 1-3, further comprising performing one or more operations to train the encoder and one or more layers of the decoder while keeping one or more pre-trained layers of the decoder fixed.

5. The computer-implemented method of any of clauses 1-4, wherein the one or more operations to convert the texture map to the neural texture map comprise inputting the texture map into a second trained machine learning model that outputs the neural texture map.

6. The computer-implemented method of any of clauses 1-5, wherein the second trained machine learning model comprises a convolutional neural network.

7. The computer-implemented method of any of clauses 1-6, further comprising performing one or more operations to train a first machine learning model and a second machine simultaneously to generate the first trained machine learning model and the second trained machine learning model, respectively.

8. The computer-implemented method of any of clauses 1-7, further comprising generating a second 3D geometry and the texture map based on a face associated with an actor included in a first video frame of a first media content item, generating a third 3D geometry based on a face associated with a dubber included in a second video frame of a second media content item, and performing one or more operations to align the third 3D geometry with the second 3D geometry to generate the first 3D geometry.

9. The computer-implemented method of any of clauses 1-8, further comprising generating a second 3D geometry and the texture map based on a face associated with an actor included in a first video frame of a first media content item, generating third 3D geometry associated with another face based on audio associated with a dubber included in a second media content item, and performing one or more operations to align the third 3D geometry with the second 3D geometry to generate the first 3D geometry.

10. The computer-implemented method of any of clauses 1-9, further comprising performing one or more operations to train the first machine learning model based on one or more other images that include the face.

11. The computer-implemented method of any of clauses 1-10, further comprising performing one or more operations to train the first machine learning model based on a plurality of images associated with a plurality of different faces.

12. In some embodiments, one or more non-transitory computer-readable media store instructions that, when executed by at least one processor, cause the at least one processor to perform steps comprising performing one or more operations to convert a texture map associated with the face to a neural texture map, and performing, via a first trained machine learning model, one or more operations to generate the image of the face based on the neural texture map and first 3D geometry associated with the face.

13. The one or more non-transitory computer-readable media of clause 12, wherein the instructions, when executed by the at least one processor, further cause the at least one processor to perform the step of performing one or more operations to convert a lighting map associated with the face to a neural lighting map, wherein the image of the face is further generated based on the neural lighting map.

14. The one or more non-transitory computer-readable media of clauses 12 or 13, wherein the first trained machine learning model comprises an encoder that encodes the neural texture map and the first 3D geometry to an embedding, and a decoder that decodes the embedding to generate the image of the face.

15. The one or more non-transitory computer-readable media of any of clauses 12-14, wherein the one or more operations to convert the texture map to the neural texture map comprise inputting the texture map into a second trained machine learning model that outputs the neural texture map.

16. The one or more non-transitory computer-readable media of any of clauses 12-15, wherein the instructions, when executed by the at least one processor, further cause the at least one processor to perform the step of performing one or more operations to train a first machine learning model and a second machine simultaneously to generate the first trained machine learning model and the second respectively.

17. The one or more non-transitory computer-readable media of any of clauses 12-16, wherein the instructions, when executed by the at least one processor, further cause the at least one processor to perform the steps of generating a second 3D geometry and the texture map based on a face associated with an actor included in a first video frame of a first media content item, generating a third 3D geometry based on a face associated with a dubber included in a second video frame of a second media content item, and performing one or more operations to align the third 3D geometry with the second 3D geometry to generate the first 3D geometry.

18. The one or more non-transitory computer-readable media of any of clauses 12-17, wherein the instructions, when executed by the at least one processor, further cause the at least one processor to perform the steps of generating a second 3D geometry and the texture map based on a face associated with an actor included in a first video frame of a first media content item, generating third 3D geometry associated with another face based on audio associated with a dubber included in a second media content item, and performing one or more operations to align the third 3D geometry with the second 3D geometry to generate the first 3D geometry.

19. The one or more non-transitory computer-readable media of any of clauses 12-18, wherein the instructions, when executed by the at least one processor, further cause the at least one processor to perform the step of performing one or more operations to train the first machine learning model based on one or more other images that include the face.

20. In some embodiments, a system comprises a memory storing instructions, and a processor that is coupled to the memory and, when executing the instructions, is configured to perform the steps of performing one or more operations to convert a texture map associated with the face to a neural texture map, and performing, via a first trained machine learning model, one or more operations to generate the image of the face based on the neural texture map and first 3D geometry associated with the face.

1. In some embodiments, a computer-implemented method for generating a dubbed media content item comprises generating first three-dimensional (3D) geometry, a texture map, and a lighting map based on a face of an actor included in a first video frame of a first media content item, generating second 3D geometry of another face based on audio associated with a dubber included in a second media content item, performing one or more operations that align the second 3D geometry with the first 3D geometry to generate an aligned second 3D geometry, and performing one or more operations, via one or more machine learning models, to render a second video frame based on the aligned second 3D geometry, the texture map, the lighting map, and the first video frame of the first media content item.

2. The computer-implemented method of clause 1, wherein generating the second 3D geometry comprises performing one or more operations to process the audio associated with the dubber using another trained machine learning model that outputs the second 3D geometry.

3. The computer-implemented method of clauses 1 or 2, wherein the another trained machine learning model comprises a sequential decoder.

4. The computer-implemented method of any of clauses 1-3, wherein the another trained machine learning model comprises an encoder that encodes the audio associated with the dubber into an embedding in an expression space and a decoder that decodes the embedding into the second 3D geometry.

5. The computer-implemented method of any of clauses 1-4, further comprising performing one or more autoregressive operations to train a machine learning model to generate the another trained machine learning model.

6. The computer-implemented method of any of clauses 1-5, further comprising performing one or more operations to train a machine learning model to generate the another trained machine learning model based on audio from one or more media content items, wherein the audio includes speech in at least two different languages.

7. The computer-implemented method of any of clauses 1-6, further comprising performing one or more operations to re-train a previously trained machine learning model based on audio from one or more media content items to generate the another trained machine learning model.

8. The computer-implemented method of any of clauses 1-7, wherein generating the first 3D geometry comprises detecting a plurality of landmarks on the face of the actor in the first video frame, performing one or more operations to fit an intermediate 3D geometry based on the plurality of landmarks, wherein the intermediate 3D geometry is defined using one or more parameters, and performing one or more operations to modify the one or more parameters of the intermediate geometry based on the first video frame and a loss function.

9. The computer-implemented method of any of clauses 1-8, wherein performing the one or more operations that align the second 3D geometry with the first 3D geometry comprises performing one or more operations to align a nose position and a mouth position of the second 3D geometry with a nose position and a mouth position of the first 3D geometry, performing one or more operations to equalize a scale of one or more expressions of the second 3D geometry with a scale of one or more expressions of the first 3D geometry, and performing one or more operations to align the second 3D geometry with the first 3D geometry when a bottom portion of the second 3D geometry is combined with a top portion of the first 3D geometry.

10. The computer-implemented method of any of clauses 1-9, wherein performing the one or more operations via the one or more machine learning models to render the third video frame comprises performing one or more operations to convert the texture map to a neural texture, performing one or more operations to convert the lighting map to a neural lighting, and processing, using a first trained machine learning model, the aligned second 3D geometry, the first video frame of the first media content item, a combination of the neural texture and the neural lighting, and an inpainting map that indicates one or more regions of the first video frame of the first media content item to inpaint to generate the third video frame.

11. In some embodiments, one or more non-transitory computer-readable media store instructions that, when executed by at least one processor, cause the at least one processor to perform steps comprising generating first three-dimensional (3D) geometry, a texture map, and a lighting map based on a face of an actor included in a first video frame of a first media content item, generating second 3D geometry of another face based on audio associated with a dubber included in a second media content item, performing one or more operations that align the second 3D geometry with the first 3D geometry to generate an aligned second 3D geometry, and performing one or more operations, via one or more machine learning models, to render a second video frame based on the aligned second 3D geometry, the texture map, the lighting map, and the first video frame of the first media content item.

12. The one or more non-transitory computer-readable media of clause 11, wherein generating the second 3D geometry comprises performing one or more operations to process the audio associated with the dubber using another trained machine learning model that outputs the second 3D geometry.

13. The one or more non-transitory computer-readable media of clauses 11 or 12, wherein the another trained machine learning model comprises a sequential decoder.

14. The one or more non-transitory computer-readable media of any of clauses 11-13, wherein the another trained machine learning model comprises an encoder that encodes the audio associated with the dubber into an embedding in an expression space and a decoder that decodes the embedding into the second 3D geometry.

15. The one or more non-transitory computer-readable media of any of clauses 11-14, wherein the instructions, when executed by the at least one processor, further cause the at least one processor to perform the step of performing one or more autoregressive operations to train a machine learning model to generate the another trained machine learning model.

16. The one or more non-transitory computer-readable media of any of clauses 11-15, wherein the instructions, when executed by the at least one processor, further cause the at least one processor to perform the step of performing one or more operations to train a machine learning model to generate the another trained machine learning model based on audio from one or more media content items, wherein the audio includes speech in at least two different languages.

17. The one or more non-transitory computer-readable media of any of clauses 11-16, wherein the instructions, when executed by the at least one processor, further cause the at least one processor to perform the step of performing one or more operations to re-train a previously trained machine learning model based on audio from one or more media content items to generate the another trained machine learning model.

18. The one or more non-transitory computer-readable media of any of clauses 11-17, wherein generating the first 3D geometry comprises detecting a plurality of landmarks on the face of the actor in the first video frame, performing one or more operations to fit an intermediate 3D geometry based on the plurality of landmarks, wherein the intermediate 3D geometry is defined using one or more parameters, and performing one or more operations to modify the one or more parameters of the intermediate geometry based on the first video frame and a loss function.

19. The one or more non-transitory computer-readable media of any of clauses 11-18, wherein the second video frame is rendered to include at least a portion of the face of the actor.

20. In some embodiments, a system comprises a memory storing instructions, and a processor that is coupled to the memory and, when executing the instructions, is configured to perform the steps of generating first three-dimensional (3D) geometry, a texture map, and a lighting map based on a face of an actor included in a first video frame of a first media content item, generating second 3D geometry of another face based on audio associated with a dubber included in a second media content item, performing one or more operations that align the second 3D geometry with the first 3D geometry to generate an aligned second 3D geometry, and performing one or more operations, via one or more machine learning models, to render a second video frame based on the aligned second 3D geometry, the texture map, the lighting map, and the first video frame of the first media content item.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating dubbed media content items, the method comprising:

generating first three-dimensional (3D) geometry, a texture map, and a lighting map based on a face of an actor included in a first video frame of a first media content item;

generating second 3D geometry based on a face of a dubber included in a second video frame of a second media content item;

performing one or more operations that align the second 3D geometry with the first 3D geometry to generate an aligned second 3D geometry;

performing one or more operations to convert the lighting map to a neural lighting; and performing one or more operations via one or more trained machine learning models to render a third video frame based on the aligned second 3D geometry, the texture map, the neural lighting, and the first video frame of the first media content item.

2. The computer-implemented method of claim 1, wherein generating the first 3D geometry comprises:

detecting a plurality of landmarks on the face of the actor included in the first video frame;

performing one or more operations to fit an intermediate 3D geometry to the plurality of landmarks; and performing one or more optimization operations to update the intermediate 3D geometry based on the first video frame and one or more loss functions.

3. The computer-implemented method of claim 2, wherein the one or more loss functions penalize a difference between a mapping of the intermediate 3D geometry to a canonical space and one or more other mappings of one or more other 3D geometries associated with the face of the actor to the canonical space.

4. The computer-implemented method of claim 2, wherein the one or more loss functions penalize one or more differences between one or more landmarks on lips of the actor included in the first video frame and one or more corresponding landmarks on lips associated with the intermediate 3D geometry.

5. The computer-implemented method of claim 2, wherein the one or more loss functions penalize one or more differences between one or more landmarks on teeth of the actor included in the first video frame and one or more corresponding landmarks on teeth associated with the intermediate 3D geometry.

6. The computer-implemented method of claim 2, wherein the one or more loss functions penalize a difference between a degree to which a mouth associated with the intermediate 3D geometry is closed and a degree to which a detected mouth of the face of the actor included in the first video frame is closed.

7. The computer-implemented method of claim 2, wherein the one or more loss functions penalize a difference between the plurality of landmarks on the face of the actor included in the first video frame and a plurality of corresponding landmarks associated with the intermediate 3D geometry.

8. The computer-implemented method of claim 1, wherein the texture map and the lighting map are generated based on a loss function that penalizes a difference between the first video frame and a fourth video frame that has been rendered using the texture map and the lighting map.

9. The computer-implemented method of claim 1, wherein performing the one or more operations that align the second 3D geometry with the first 3D geometry comprises:

performing one or more operations to align a nose position and a mouth position associated with the second 3D geometry with a nose position and a mouth position associated with the first 3D geometry;

performing one or more operations to equalize a scale of one or more expressions associated with the second 3D geometry with a scale of one or more expressions associated with the first 3D geometry; and performing one or more optimization operations to determine the one or more expressions associated with the second 3D geometry when combining a bottom portion of the second 3D geometry with a top portion of the first 3D geometry.

10. The computer-implemented method of claim 1, wherein performing the one or more operations to render the third video frame comprises:

performing one or more operations to convert the texture map to a neural texture; and processing, using a first trained machine learning model, the aligned second 3D geometry, the first video frame, a mask indicating one or more regions of the first video frame to be inpainted, and a combination of the neural texture and the neural lighting to generate the third video frame.

11. One or more non-transitory computer-readable media storing instructions that, when executed by at least one processor, cause the at least one processor to perform steps comprising:

generating first three-dimensional (3D) geometry, a texture map, and a lighting map based on a face of an actor included in a first video frame of a first media content item;

generating second 3D geometry based on a face of a dubber included in a second video frame of a second media content item;

performing one or more operations that align the second 3D geometry with the first 3D geometry to generate an aligned second 3D geometry;

performing one or more operations to convert the lighting map to a neural lighting; and performing one or more operations via one or more trained machine learning models to render a third video frame based on the aligned second 3D geometry, the texture map, the neural lighting, and the first video frame of the first media content item.

12. The one or more non-transitory computer-readable media of claim 11, wherein generating the first 3D geometry comprises:

detecting a plurality of landmarks on the face of the actor included in the first video frame;

performing one or more operations to fit an intermediate 3D geometry to the plurality of landmarks; and performing one or more optimization operations to update the intermediate 3D geometry based on the first video frame and one or more loss functions.

13. The one or more non-transitory computer-readable media of claim 12, wherein the one or more loss functions penalize a difference between a mapping of the intermediate 3D geometry to a canonical space and one or more other mappings of one or more other 3D geometries associated with the face of the actor to the canonical space.

14. The one or more non-transitory computer-readable media of claim 12, wherein the one or more loss functions penalize one or more differences between one or more landmarks on at least one of lips or teeth of the actor included in the first video frame and one or more corresponding landmarks on at least one of lips or teeth associated with the intermediate 3D geometry.

15. The one or more non-transitory computer-readable media of claim 11, wherein performing the one or more operations that align the second 3D geometry with the first 3D geometry comprises:

performing one or more operations to align a nose position and a mouth position associated with the second 3D geometry with a nose position and a mouth position associated with the first 3D geometry;

performing one or more operations to equalize a scale of one or more expressions associated with the second 3D geometry with a scale of one or more expressions associated with the first 3D geometry; and performing one or more optimization operations to determine the one or more expressions associated with the second 3D geometry when combining a bottom portion of the second 3D geometry with a top portion of the first 3D geometry.

16. The one or more non-transitory computer-readable media of claim 11, wherein performing the one or more operations to render the third video frame comprises:

performing one or more operations to convert the texture map to a neural texture; and processing, using a first trained machine learning model, the aligned second 3D geometry, the first video frame, a mask indicating one or more regions of the first video frame to be inpainted, and a combination of the neural texture and the neural lighting to generate the third video frame.

17. The one or more non-transitory computer-readable media of claim 16, wherein performing the one or more operations to render the third video frame further comprises performing one or more operations to crop and center the face of the actor in the first video frame based on the first 3D geometry.

18. The one or more non-transitory computer-readable media of claim 16, wherein the mask is applied to one or more feature spaces of the first trained machine learning model.

19. The one or more non-transitory computer-readable media of claim 16, wherein the first trained machine learning model comprises an encoder network and a decoder network.

20. A system, comprising:

a memory storing instructions; and a processor that is coupled to the memory and, when executing the instructions, is configured to perform the steps of:

generating first three-dimensional (3D) geometry, a texture map, and a lighting map based on a face of an actor included in a first video frame of a first media content item, generating second 3D geometry based on a face of a dubber included in a second video frame of a second media content item, performing one or more operations that align the second 3D geometry with the first 3D geometry to generate an aligned second 3D geometry, performing one or more operations to convert the lighting map to a neural lighting, and performing one or more operations via one or more trained machine learning models to render a third video frame based on the aligned second 3D geometry, the texture map, the neural lighting, and the first video frame of the first media content item.

*     *     *     *     *